(12) United States Patent
Asada et al.

(10) Patent No.: US 9,704,304 B2
(45) Date of Patent: Jul. 11, 2017

(54) SYSTEM FOR MANAGING MINING MACHINERY, METHOD FOR MANAGING MINING MACHINERY, AND DUMP TRUCK

(71) Applicant: Komatsu Ltd., Tokyo (JP)

(72) Inventors: Hisashi Asada, Yokohama (JP); Kenji Doishita, Isehara (JP); Dai Tsubone, Kawasaki (JP); Tetsuya Akiyama, Kawasaki (JP); Ryomei Kurokawa, Musashino (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 14/648,907

(22) PCT Filed: Nov. 27, 2014

(86) PCT No.: PCT/JP2014/081476
§ 371 (c)(1),
(2) Date: Jun. 1, 2015

(87) PCT Pub. No.: WO2015/076420
PCT Pub. Date: May 28, 2015

(65) Prior Publication Data
US 2016/0155277 A1    Jun. 2, 2016

(51) Int. Cl.
*G07C 5/08* (2006.01)
*G01L 5/00* (2006.01)
(Continued)

(52) U.S. Cl.
CPC .............. *G07C 5/08* (2013.01); *B60C 11/246* (2013.04); *B60C 19/00* (2013.01); *B60C 23/06* (2013.01); *B60G 17/04* (2013.01); *G01L 5/0061* (2013.01); *G01P 15/00* (2013.01); *B60C 2019/004* (2013.04); *B60G 2300/09* (2013.01); *B60G 2400/5182* (2013.01); *B60G 2400/61* (2013.01); *B60G 2800/802* (2013.01); *G06Q 50/02* (2013.01)

(58) Field of Classification Search
CPC ......... G07C 5/08; G01L 5/0061; B60C 19/00; B60C 2019/004; G01P 15/00

USPC .......................................................... 701/70
See application file for complete search history.

(56) References Cited

U.S. PATENT DOCUMENTS

| | | |
|---|---|---|
| 8,364,355 B2 | 1/2013 | Saito |
| 8,428,823 B2 | 4/2013 | Saito et al. |

(Continued)

FOREIGN PATENT DOCUMENTS

| | | |
|---|---|---|
| CN | 202029654 U | 11/2011 |
| CN | 203063595 U | 7/2013 |

(Continued)

OTHER PUBLICATIONS

International Search Report and Written Opinion mailed Feb. 24, 2015, issued for PCT/JP2014/081476.
(Continued)

*Primary Examiner* — Anne M Antonucci
(74) *Attorney, Agent, or Firm* — Locke Lord LLP

(57) ABSTRACT

A management system for a mining machine on which tires are mounted and which travels in a mine by operation performed by a driver includes: a determination unit configured to determine whether or not a damaging operation damaging the tires has been carried out; a data acquisition unit configured to acquire damaging operation data indicating carrying out of the damaging operation, and one or both of driver identification data indicating a driver who has carried out the damaging operation and position data indicating a position of the mining machine on which the damaging operation has been carried out; and a data output unit configured to output association data containing the damaging operation data associated with one or both of the driver identification data and the position data.

17 Claims, 17 Drawing Sheets

(51) Int. Cl.
*G01P 15/00* (2006.01)
*B60C 19/00* (2006.01)
*B60C 23/06* (2006.01)
*B60G 17/04* (2006.01)
*B60C 11/24* (2006.01)
*G06Q 50/02* (2012.01)

(56) References Cited

U.S. PATENT DOCUMENTS

2013/0013347 A1\* 1/2013 Ling ............... G06Q 40/08
 705/4
2014/0244098 A1 8/2014 Ueda et al.

FOREIGN PATENT DOCUMENTS

| JP | H07273714 A | 10/1995 |
| JP | 2008-065753 A | 3/2008 |
| JP | 2013-105278 A | 5/2013 |
| WO | WO-2008/146846 A1 | 12/2008 |
| WO | WO-2009/130866 A1 | 10/2009 |

OTHER PUBLICATIONS

Office Action dated Jun. 11, 2015, issued for the corresponding Australian patent application No. 2014354005.

\* cited by examiner

REFERENCE TRAVEL PATH

DRIVER IDENTIFICATION DATA

SYSTEM FOR MANAGING MINING MACHINERY, METHOD FOR MANAGING MINING MACHINERY, AND DUMP TRUCK

FIELD

The present invention relates to a system for managing mining machinery, a method for managing mining machinery, and a dump truck.

BACKGROUND

Mining machines having tires such as those disclosed in Patent Literature 1 operate in mining sites in mines.

CITATION LIST

Patent Literature

Patent Literature 1: WO 2009/130866 A

SUMMARY

Technical Problem

If a mining machine is inappropriately operated while the mining machine is operated by a driver, this may damage tires of the mining machine. Damage to tires, resulting in shorter lifetime of the tires, leads to a decrease in the productivity and an increase in the production cost of the mine.

Aspects of the present invention aim at providing a system for managing mining machinery, a method for managing mining machinery, and a dump truck that are capable of preventing shortening of the lifetime of tires.

Solution to Problem

According to a first embodiment of the invention, there is provided a management system for a mining machine on which tires are mounted and which travels in a mine by operation performed by a driver, the management system comprising: a determination unit configured to determine whether or not a damaging operation damaging the tires has been carried out; a data acquisition unit configured to acquire damaging operation data indicating carrying out of the damaging operation, and one or both of driver identification data indicating the driver who has carried out the damaging operation and position data indicating a position of the mining machine on which the damaging operation has been carried out; and a data output unit configured to output association data containing the damaging operation data associated with one or both of the driver identification data and the position data.

In the first embodiment of the present invention, the management system for a mining machine can comprise a position detection device configured to detect a position of the mining machine, wherein the data acquisition unit can acquire the position data from the position detection device.

In the first embodiment of the present invention, the damaging operation can include at least one of a rapid deceleration operation of decelerating the mining machine at a first speed or higher per unit time, a stationary steering operation of changing a direction of the tires of the mining machine at a second speed or lower, and an aggressive cornering operation of making the mining machine travel along a curve having a radius of curvature of a predetermined value or smaller at a third speed or higher.

In the first embodiment of the present invention, the management system for a mining machine can comprise a speed detection device configured to detect a traveling speed and a deceleration of the mining machine, wherein the determination unit can determine whether or not the damaging operation has been carried out on the basis of a detection signal from the speed detection device.

In the first embodiment of the present invention, the management system for a mining machine can comprise a load detection device configured to detect a load acting on the tire, wherein the damaging operation can include a rapid deceleration operation of decelerating the mining machine at a first speed or higher per unit time, and the determination unit can determine whether or not the rapid deceleration operation has been carried out on the basis of deceleration data indicating the deceleration of the mining machine and load data indicating the load acting on the tires.

In the first embodiment of the present invention, the management system for a mining machine can comprise a first estimation unit configured to estimate an amount of damage to the tires caused by the rapid deceleration operation, wherein when the deceleration of the mining machine is represented by A and the load acting on the tires is represented by LD, the first estimation unit can estimate the amount of damage on the basis of a result of calculation of (LD×A), and rapid deceleration operation data indicating carrying out of the rapid deceleration operation can contain the amount of damage estimated by the first estimation unit.

In the first embodiment of the present invention, the management system for a mining machine can comprise a steering force detection device configured to detect a steering force that changes a direction of the tires, wherein the damaging operation can include a stationary steering operation of changing the direction of the tires at a second speed or lower, and the determination unit can determine whether or not the stationary steering operation has been carried out on the basis of traveling speed data indicating the traveling speed of the mining machine and steering force data indicating the steering force.

In the first embodiment of the present invention, the management system for a mining machine can comprise a second estimation unit configured to estimate an amount of damage to the tires caused by the stationary steering operation, wherein when a load acting on the tires is represented by LD, the second estimation unit estimates the amount of damage on the basis of LD, and stationary steering operation data indicating carrying out of the stationary steering operation can contain the amount of damage estimated by the second estimation unit.

In the first embodiment of the present invention, the management system for a mining machine can comprise a load detection device configured to detect a load acting on the tires, wherein the damaging operation can include an aggressive cornering operation of making the mining machine travel along a curve having a radius of curvature of a predetermined value or smaller at a third speed or higher, and the determination unit can determine whether or not the aggressive cornering operation has been carried out on the basis of traveling speed data indicating the traveling speed of the mining machine, load data indicating the load acting on the tires, and the radius of curvature of the curve.

In the first embodiment of the present invention, the management system for a mining machine can comprise a third estimation unit configured to estimate an amount of damage to the tires caused by the aggressive cornering operation, wherein when the traveling speed of the mining machine is represented by V, the load acting on the tires is represented by LD, and the radius of curvature of the corner is represented by R, the third estimation unit can estimate the amount of damage on the basis of a result of calculation of $(LD \times V^2)/R$, and aggressive cornering operation data indicating carrying out of the aggressive cornering operation can contain the amount of damage estimated by the third estimation unit.

In the first embodiment of the present invention, the mining machine can include a dump truck having a vehicle body and a vessel supported by the vehicle body, and the load acting on the tires can vary according to a load placed on the vessel.

In the first embodiment of the present invention, the data acquisition unit can acquire mining machine identification data indicating the mining machine on which the damaging operation has been carried out, and the association data can contain the damaging operation data associated with the mining machine identification data.

In the first embodiment of the present invention, the data acquisition unit can acquire time point data indicating a time point at which the damaging operation has been carried out, and the association data can contain the damaging operation data associated with the time point data.

In the first embodiment of the present invention, the management system for a mining machine can comprise a travel path computation unit configured to generate a reference travel path in the mine on the basis of position data of an actual travel path along which multiple mining machines have traveled in the mine, wherein the data acquisition unit can acquire the damaging operation data when the mining machine is present on the reference travel path.

In the first embodiment of the present invention, the data output unit can include a report creation unit configured to create a report of the association data.

According to a second embodiment of the invention, there is provided a management method for a mining machine on which tires are mounted and which travels in a mine by operation performed by a driver, the management method comprising: determining whether or not a damaging operation damaging the tires has been carried out; acquiring damaging operation data indicating carrying out of the damaging operation, and one or both of driver identification data indicating a driver who has carried out the damaging operation and position data indicating a position of the mining machine on which the damaging operation has been carried out; and outputting association data containing the damaging operation data associated with one or both of the driver identification data and the position data.

According to a third embodiment of the invention, there is provided a dump truck on which tires are mounted and which travels in a mine by operation performed by a driver, the dump truck comprising: a determination unit configured to determine whether or not a damaging operation damaging the tires has been carried out; a data acquisition unit configured to acquire damaging operation data indicating carrying out of the damaging operation, and one or both of driver identification data indicating a driver who has carried out the damaging operation and position data indicating a position on which the damaging operation has been carried out; and a data output unit configured to output association data containing the damaging operation data associated with one or both of the driver identification data and the position data.

Advantageous Effects of Invention

According to the aspects of the present invention, a system for managing mining machinery, a method for managing mining machinery, and a dump truck that are capable of preventing shortening of the lifetime of tires are provided.

DESCRIPTION OF EMBODIMENTS

An embodiment according to the present invention will be described below with reference to the drawings; the present invention, however, is not limited thereto. Components in the embodiment described below can be combined as appropriate. Furthermore, some of the components may not be used.

<Mine and Mining Machinery>

Figure 1:
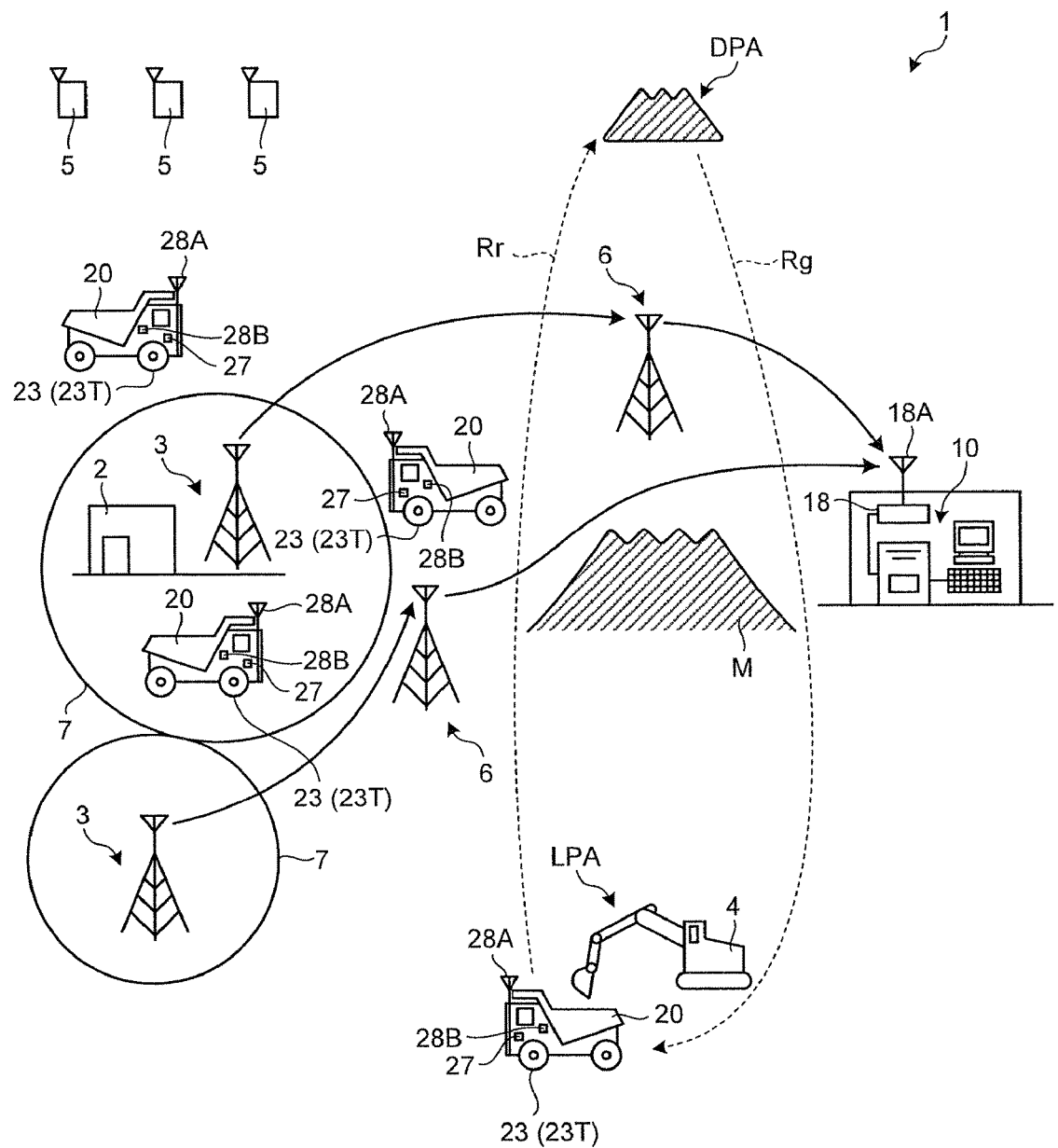
FIG. 1 is a diagram schematically illustrating an example of a mine in which mining machines according to an embodiment operate.

FIG. 1 is a diagram schematically illustrating an example of a mine in which mining machines according to the present embodiment operate.

Mining machines are used for operations in a mine. The mining machines include at least one of carrier vehicles, excavators, and loaders. In the present embodiment, an example in which the mining machines are mostly dump trucks 20 will be described. A dump truck 20 is a type of a carrier vehicle that carries a load in a mine. The load includes soil or rocks and stones resulting from digging crushed stones. Note that the mining machines are not limited to the dump trucks 20. A mining machine may be at least one of a hydraulic excavator, an electric excavator, and a wheel loader that function as excavators or loaders.

In the present embodiment, a dump truck 20 includes a driver's cab (cab). The dump truck 20 is operated by a driver (operator) in the cab. Specifically, in the present embodiment, the dump truck 20 is what is called a manned dump truck. The dump truck 20 is operated by the driver to travel in the mine. The dump truck 20 is operated by the driver to unload a load. Alternatively, the dump truck 20 may be an unmanned dump truck whose operation is controlled by a management system 1.

The dump truck 20 has wheel assemblies 23 each having a tire 23T. In the mine, the dump truck 20 travels at least part of a loading site LPA where loading operation is carried out, a soil discharging site DPA where unloading operation is carried out, a travel path Rg to the loading site LPA, and a travel path Rr to the soil discharging site DPA. At the loading site LPA, the dump truck 20 is loaded by a loader 4 such as a hydraulic excavator. At the soil discharging site DPA, the dump truck 20 unloads the load. The dump truck 20 travels at least one of the travel path Rg and the travel path Rr to move between the loading site LPA and the soil discharging site DPA.

<Outline of Management System>

Next, an outline of the management system 1 according to the present embodiment will be described. The management system 1 carries out at least one of management of operations of mining machines, evaluation of the productivity of the mining machines, evaluation of the operation skills of drivers of the mining machines, preventive maintenance of the mining machines, and abnormality diagnosis of the mining machines. In the present embodiment, an example in which the management system 1 mainly manages dump trucks 20 will be described.

In the present embodiment, the management system 1 generates a reference travel path in the mine on the basis of an actual travel path along which a dump truck 20 has traveled. Furthermore, in the present embodiment, the management system 1 manages a damaging operation that damages the tires 23T of the dump truck 20.

The management system 1 includes a management device 10 including a computer system. The management device 10 is installed in a management facility of the mine. The management device 10 acquires operational data indicating the operational condition of a dump truck 20 from the dump truck 20. The management device 10 acquires the operational data from the dump truck 20 through radio communication.

The management device 10 collects the operational data of the dump truck 20. The operational data of the dump truck 20 includes at least one of position data indicating the position of the dump truck 20, travel data indicating the travel condition of the dump truck 20, and abnormality data indicating the abnormality of the dump truck 20.

The position data of the dump truck 20 includes longitude, latitude, and altitude coordinates of the dump truck 20. The position data of the dump truck 20 includes three-dimensional position data.

The travel data of the dump truck 20 includes at least one of the traveling speed, the acceleration (the increase in the traveling speed per unit time) of traveling, the deceleration (the decrease in the traveling speed per unit time) of traveling, the traveling time, and the traveling distance of the dump truck 20.

The management device 10 is connected to a management wireless communication device 18. The management wireless communication device 18 has an antenna 18A. The dump truck 20 includes an in-vehicle wireless communication device 27. The in-vehicle wireless communication device 27 has an antenna 28A. The management wireless communication device 18 and the in-vehicle wireless communication device 27 allow transmission of data between the management device 10 and the dump truck 20. The management device 10 collects the operational data of the dump truck 20 that works in the mine via the management wireless communication device 18 and the in-vehicle wireless communication device 27. The dump truck 20 transmits and receives data to/from the management device 10 via the management wireless communication device 18 and the in-vehicle wireless communication device 27.

The dump truck 20 has an antenna 28B that receives radio waves from a GPS satellite 5. The GPS satellite 5 constitutes a global navigation satellite system. The GPS satellite 5 is a GNSS (global navigation satellite systems) satellite. The antenna 28B is a GNSS antenna. The dump truck 20 measures its position on the basis of radio waves received by the antenna 28B. The satellite with which the dump truck 20 measures its position is not limited to the GNSS satellite but another positioning satellite may be used. For example, a RTK-GNSS (real time kinematic-global navigation satellite systems) satellite may be used.

Radio wave output transmitted by the dump truck 20 via the antenna 28A does not have a communication coverage sufficient to cover the whole mine. Furthermore, radio waves transmitted from the antenna 28A cannot be transmitted over a long distance over obstacles such as high hills because of the wavelength. Of course, if a wireless communication device capable of outputting high-power radio waves is used, such communication failure can be overcome, the communication coverage can be made wider, and areas where communication is disabled can be eliminated. Since, however, a mine is vast, it is necessary to address such conditions that the cost for relays and communication devices needs to be reduced and that constructed communication infrastructure cannot be expected depending on the region of the mine. Thus, for the management system 1, a wireless system capable of forming data communication network within a limited range such as a wireless LAN (local area network) is used. With the wireless LAN or the like, mutual communication between mining machines and a management facility (management device 10) can be developed at low cost but the problem of communication failure remains to be solved. Note that the wireless system is not limited to the wireless LAN. Communication infrastructure like a mobile telephone network may be used as the wireless system.

The reachable range of radio waves transmitted by the dump truck 20 via the antenna 28A is limited. Thus, if the distance between the dump truck 20 and the management device 10 is long or is an obstacle such as a mountain M is present therebetween, it is difficult for the management wireless communication device 18 to receive radio waves transmitted from the dump truck 20. The management system 1 thus includes relays 3 that relay radio waves transmitted from the antenna 28A of the dump truck 20 and transmit the radio waves to the management wireless communication device 18. Placement of the relays 3 at multiple predetermined positions in the mine allows the management device 10 to collect operational data from a dump truck 20 that is operating at a position far from the management device 10 through radio communication.

If the distance form a relay 3 to the management wireless communication device 18 is long, an intermediate relay 6 for relay between the relay 3 and the management wireless communication device 18 is placed. In the present embodiment, the intermediate relay 6 only relays radio waves between the relay 3 and the management wireless communication device 18 but does not relay radio waves transmitted by the dump truck 20 via the antenna 28A. In the present embodiment, the intermediate relay 6 is configured not to relay radio waves other than those from the associated relay 3. For example, as illustrated in FIG. 1, it is only one intermediate relay 6 that relays radio waves from the relay 3 at a gas station 2. Although the intermediate relay 6 is illustrated in one-to-one association with one relay 3 in FIG. 1, the association is not limited to one-to-one association but each intermediate relay 6 may relay radio waves transmitted from multiple associated relays 3.

A given area around the location of a relay 3, which is indicated by a circle in FIG. 1, is a range within which a first wireless communication device of the dump truck 20 can carry out mutual radio communication with the relay 3, that is, a communication coverage 7. The dump truck 20 present within the communication coverage 7 can carry out mutual radio communication with the management wireless communication device 18 via the relay 3 and the like. The first wireless communication device mentioned above is the in-vehicle wireless communication device 27 illustrated in FIG. 3.

Next, the management device 10 will be described in more detail.

<Management Device>

Figure 2:
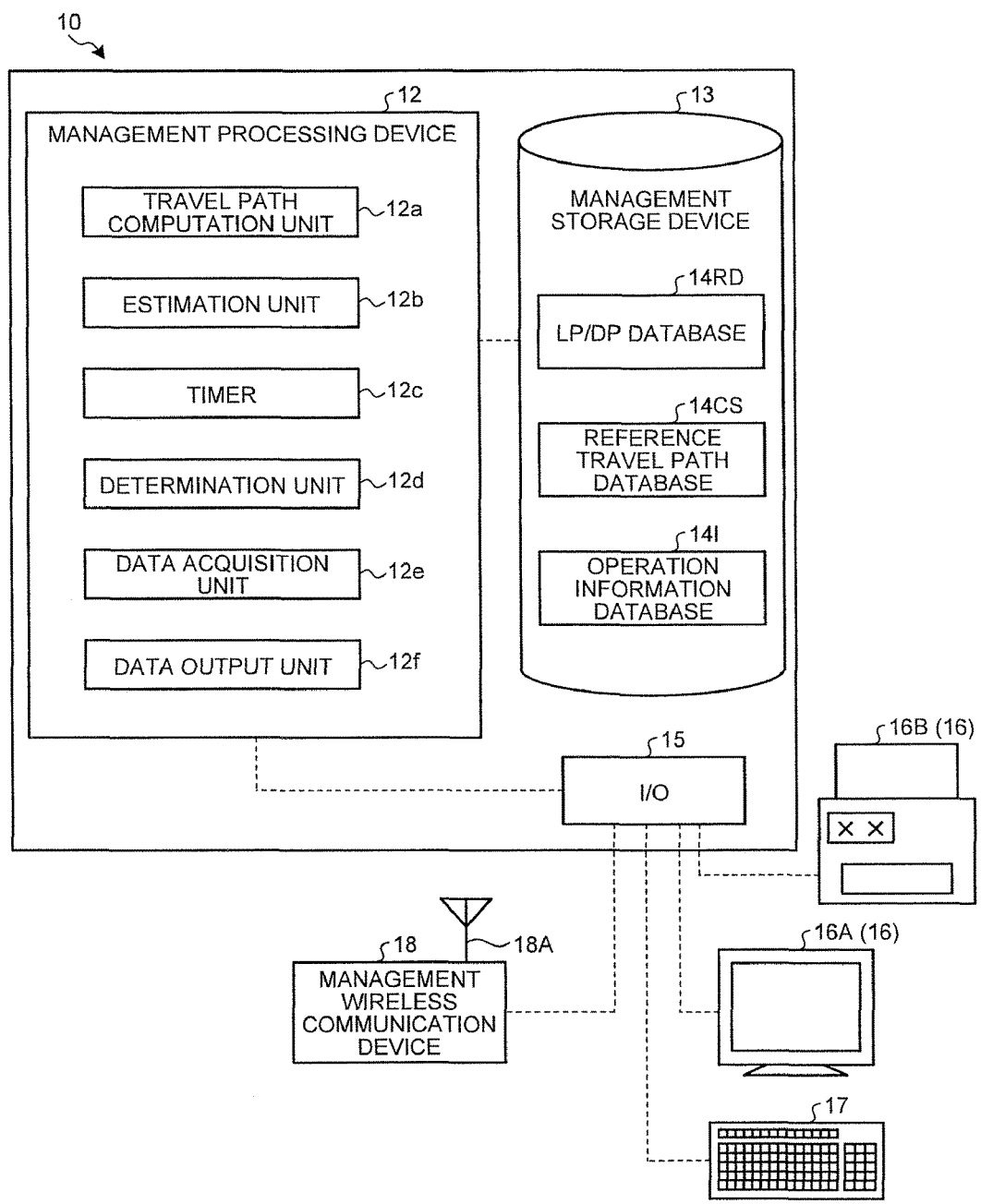
FIG. 2 is a functional block diagram illustrating an example of a management device in a management system according to the present embodiment.

Next, an example of the management device 10 according to the present embodiment will be described. FIG. 2 is a functional block diagram illustrating an example of the management device 10 in the management system 1 according to the present embodiment.

The management device 10 includes a computer system. As illustrated in FIG. 2, the management device 10 includes a management processing device 12, a management storage device 13, and an input/output unit (I/O) 15. The management device 10 also includes an output device 16, an input device 17 and the management wireless communication device 18. The management processing device 12 is connected to the output device 16, the input device 17, and the management wireless communication device 18 via the input/output unit 15.

The management processing device 12 includes a CPU (central processing unit). The management storage device 13 includes at least one of a RAM (random access memory), a ROM (read only memory), flash memory, and a hard disk drive. The input/output unit 15 is used for an interface with the management processing device 12, the output device 16, the input device 17, and the management wireless communication device 18.

The management processing device 12 includes a travel path computation unit 12a, an estimation unit 12b, a timer 12c, a determination unit 12d, a data acquisition unit 12e, and a data output unit 12f.

The travel path computation unit 12a generates a reference travel path of the mine on the basis of position data of actual travel paths acquired from multiple dump trucks 20 in the mine. An actual travel path is a travel path along which a dump truck 20 has actually traveled. When the travel path computation unit 12a has newly acquired position data of an actual travel path, the travel path computation unit 12a regenerates the reference travel path by using the newly acquired position data of the actual travel path.

The estimation unit 12b estimates the amount of damage DM to the tires 23T on the basis of at least one of the radius of curvature of a curve in the reference travel path along which the dump truck 20 travels, the traveling speed of the dump truck 20 on the reference travel path, the deceleration (negative acceleration) of the traveling dump truck 20, and the load acting on the tires 23T on the dump truck 20.

The timer 12c measures the time (a time point) and a time period.

The determination unit 12d determines whether or not a damaging operation that damages the tire 23T is carried out on the basis of at least one of the radius of curvature of a curve in the reference travel path along which the dump truck 20 travels, the traveling speed of the dump truck 20 on the reference travel path, the deceleration (negative acceleration) of the traveling dump truck 20, the load acting on the tires 23T on the dump truck 20, and the steering force that changes the direction of the tires 23T.

The data acquisition unit 12e acquires at least one of damaging operation data indicating carrying out of damaging operation that damages tires, driver identification data indicating the driver that has carried out damaging operation, position data on the reference travel path of the dump truck 20 on which damaging operation is carried out, dump truck identification data indicating the dump truck 20 on which damaging operation is carried out, and time point data indicating the time point when damaging operation is carried out.

The data output unit 12f outputs association data containing damaging operation data associated with driver identification data. The data output unit 12f outputs association data containing damaging operation data associated with position data. Note that the association data output from the data output unit 12f may contain damaging operation data associated with dump truck identification data. The association data output from the data output unit 12f may contain damaging operation data associated with time point data. The data output unit 12f outputs the association data to the output device 16.

The data output unit 12f functions as a report creating unit that creates a report of the association data. The data output unit 12f can also create a report of the amount of damage DM to the tires 23T of the dump truck 20 estimated by the estimation unit 12b. The data output unit 12f outputs the created report to the output device 16.

The management storage device 13 stores computer programs for executing processing at the management processing device 12. The computer programs stored in the management storage device 13 include a reference travel path generation computer program for generating a reference travel path from position data on an actual travel path of a dump truck 20 and an operational data collection computer program for collecting operational data of a dump truck 20.

The management storage device 13 stores an LP/DP database 14RD, a reference travel path database 14CS, and an operation information database 14I. The LP/DP database 14RD retains position data of the loading site LPA and the soil discharging site DPA of the dump truck 20. The reference travel path database 14CS retains reference travel path data generated by the travel path computation unit 12a. The operation information database 14I retains operational data collected from the dump truck 20.

The output device 16 makes data output from the data output unit 12f visible. The output device 16 outputs (makes visible) association data output from the data output unit 12f. The output device 16 outputs (makes visible) a report output from the data output unit 12f. In the present embodiment, the output device 16 includes a display device 16A and a printing device 16B. The display device 16A includes a flat panel display such as a liquid crystal display, and displays association data or a report. The printing device 16B includes a printer such as an inkjet printer, and prints association data or a report. The display device 16A displays association data to make the association data visible. The display device 16A displays a report to make the report visible. The printing device 16B prints association data to make the association data visible. The printing device 16B prints a report to make the association data visible. Alternatively, the output device 16 may output (make audible) data output from the data output unit 12f in the form of audio.

The input device 17 includes input devices such as a keyboard, a touch panel, and a mouse.

The management wireless communication device 18 has an antenna 18A. The management wireless communication device 18 carries out radio communication with the in-vehicle wireless communication device 27 of the dump truck 20.

<Dump Truck>

Figure 3:
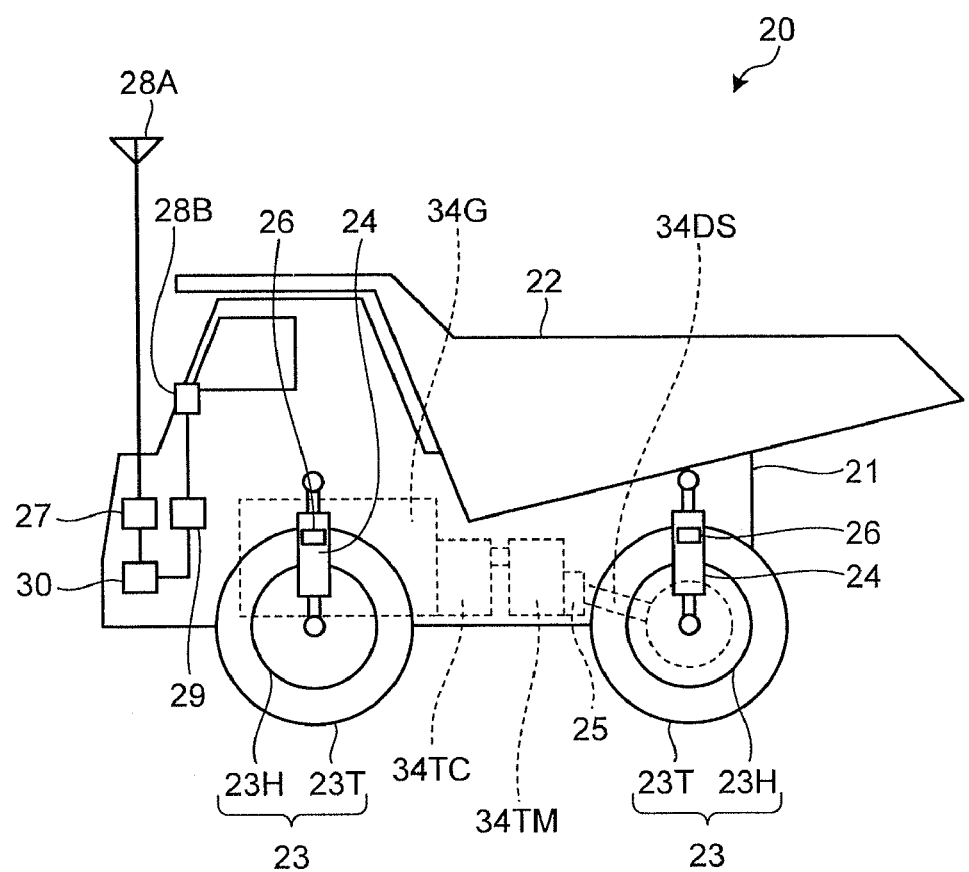
FIG. 3 is a diagram schematically illustrating an example of a dump truck according to the present embodiment.

Next, an example of the dump truck 20 according to the present embodiment will be described. FIG. 3 is a diagram schematically illustrating an example of the dump truck 20 according to the present embodiment. The dump truck 20 includes a vehicle body 21, a vessel 22 supported by the vehicle body 21, wheel assemblies 23 each having a tire 23T and a wheel 23H, suspension cylinders 24, a rotation sensor 25, pressure sensors (suspension pressure sensors) 26, the in-vehicle wireless communication device 27 to which the antenna 28A for radio communication is connected, a position detection device 29 to which the GNSS antenna 28B is connected, and an in-vehicle data collection device 30. In the present embodiment, the position detection device 29 includes a GNSS receiver.

In the present embodiment, the dump truck 20 is a rigid dump truck. Alternatively, the dump truck 20 may be an articulated dump truck including a vehicle body divided into a front part and a rear part, and a free joint connecting the front part and the rear part of the vehicle body.

The dump truck 20 includes an engine (internal combustion engine) 34G such as a diesel engine. The engine 34G drives a drive shaft 34DS via a torque converter 34TC and a transmission 34TM. As a result of driving of the drive shaft 34DS, the wheel assemblies 23 are driven.

In the present embodiment, the dump truck 20 is what is called a mechanically driven type. Note that the drive system of the dump truck 20 may not be the mechanical drive system. The drive system of the dump truck 20 may be what is called an electric drive system.

The vessel 22 functions as a bed. Loads are placed on the vessel 22. The vessel 22 is tiltably provided at the top of the vehicle body 21. The loader 4 places loads on the vessel 22.

A wheel assembly 23 includes a tire 23T and a wheel 23H by which the tire 23T is supported. The wheel assembly 23 is rotatably mounted on the vehicle body 21.

A suspension cylinder 24 is placed between a wheel assembly 23 and the vehicle body 21. Hydraulic oil is encapsulated inside the suspension cylinders 24. The suspension cylinders 24 extend and compress depending on the weight of the load. A load according to the mass of the vehicle body 21 and the vessel 22 (including the load) acts on the wheel assemblies 23 via the suspension cylinders 24.

The rotation sensor 25 detects the rotational speed of the drive shaft 34DS that drives the wheel assemblies 23 to detect the traveling speed (vehicle speed) of the dump truck 20.

The pressure sensors 26 detects loads acting on the suspension cylinders 24. The pressure sensors 26 are provided on the suspension cylinders 24 of the dump truck 20. The pressure sensors 26 detect the pressures of hydraulic oil in the suspension cylinders 24 to detect the weight (load) of the load. The pressure sensors 26 detects the load acting on the tires 23T (wheel assemblies 23) on the dump truck 20.

The GNSS antenna 28B receives radio waves output from multiple GPS satellites 5 constituting the GNSS (global navigation satellite systems). The antenna 28B outputs the received radio waves to the position detection device 29. The position detection device 29 converts the radio waves received by the antenna 28B into electrical signals, and calculates its position. The position detection device 29 is placed on the dump truck 20. As a result of calculating the position of the position detection device 29 by the position detection device 29, the position of the dump truck 20 is calculated. The position detection device 29 acquires the position data of the dump truck 20.

The position data of the dump truck 20 contains longitude, latitude, and altitude coordinates. The position data of the dump truck 20 is three-dimensional position data of the dump truck 20. The position detection device 29 acquires the position data of the dump truck 20 at predetermined time intervals. The actual travel path data of the dump truck 20 contains multiple position data of the dump truck 20 acquired at the predetermined time intervals.

Note that the position data of the dump truck 20 may not be acquired by the position detection device 29. For example, the position data of the dump truck 20 may be obtained on the basis of data acquired from at least one of a speed sensor that detects the traveling speed of the dump truck 20, an acceleration sensor that detects the acceleration of the dump truck 20, and an attitude detection sensor that detects the attitude of the dump truck 20.

The in-vehicle wireless communication device 27 carries out radio communication with the management wireless communication device 18 of the management device 10.

<Control System of Dump Truck>

Figure 4:
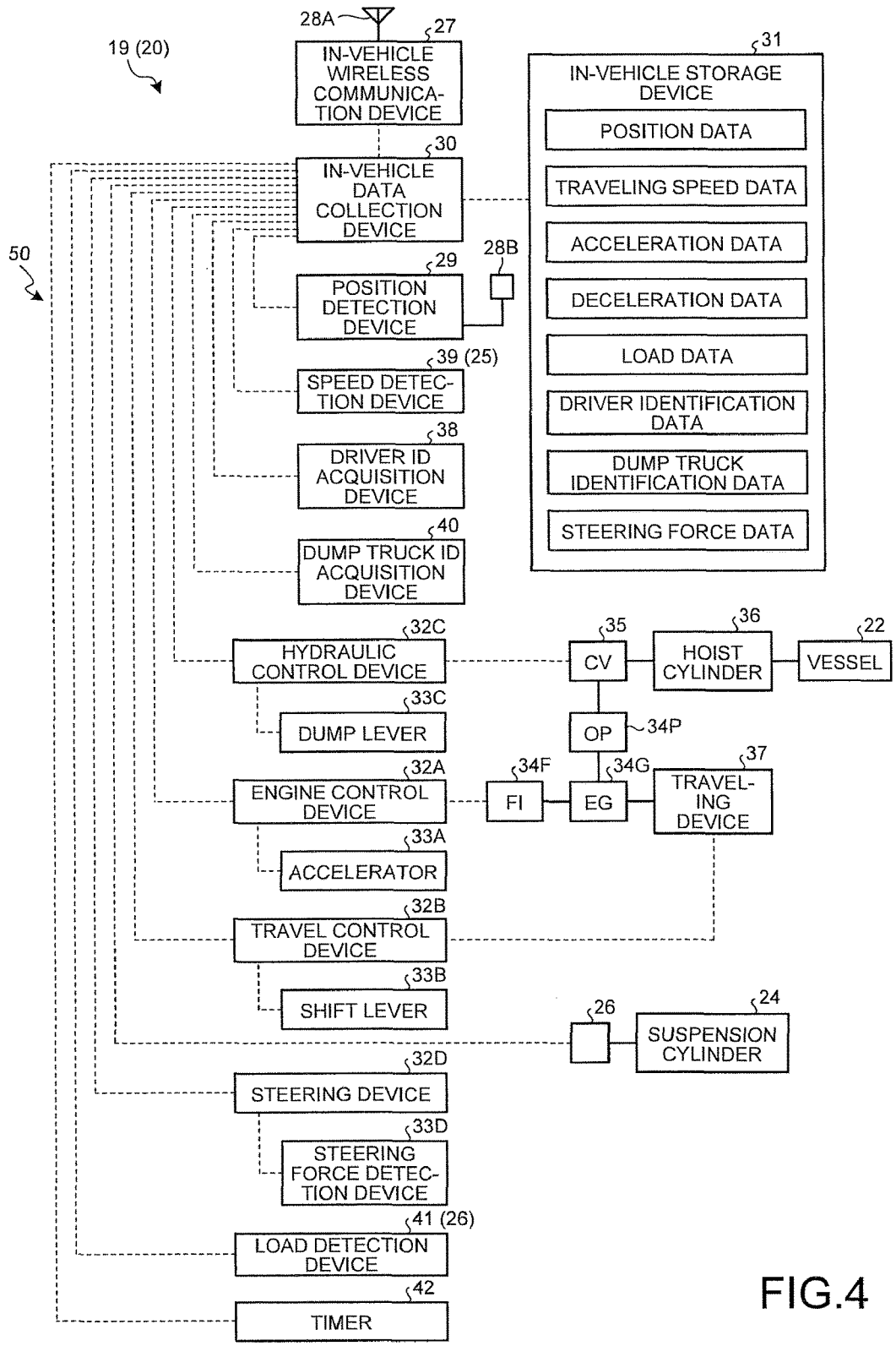
FIG. 4 is a functional block diagram illustrating an example of a control system of the dump truck according to the present embodiment.

Next, an example of a control system 19 of the dump truck 20 according to the present embodiment will be described. FIG. 4 is a functional block diagram illustrating an example of the control system 19 of the dump truck 20 according to the present embodiment.

The control system 19 includes the in-vehicle data collection device 30 that collects operational data of the dump truck 20 and an in-vehicle storage device 31. The in-vehicle data collection device 30 is mounted on the dump truck 20. The in-vehicle data collection device 30 includes a computer system. The in-vehicle data collection device 30 includes a CPU (central processing unit), for example. The in-vehicle storage device 31 includes at least one of a RAM (random access memory), a ROM (read only memory), flash memory, and a hard disk drive.

The control system 19 includes a condition acquisition device 50 that acquires the operational data of the dump truck 20. The in-vehicle data collection device 30 is connected to the condition acquisition device 50. The in-vehicle data collection device 30 collects the operational data from the condition acquisition device 50.

The in-vehicle data collection device 30 is connected to the in-vehicle storage device 31. The in-vehicle data collection device 30 is connected to the in-vehicle wireless communication device 27. The operational data of the dump truck 20 collected by the in-vehicle data collection device 30 is stored in the in-vehicle storage device 31. The operational data of the dump truck 20 collected by the in-vehicle data collection device 30 is transmitted to the management device 10 via the in-vehicle wireless communication device 27.

The condition acquisition device 50 includes multiple devices that acquire the operational data of the dump truck 20. The condition acquisition device 50 includes the position detection device 29 that detects the position of the dump truck 20, a speed detection device 39 that detects the traveling speed, the acceleration, and the deceleration of the dump truck 20, a load detection device 41 that detects the load acting on the tires 23T, a driver ID acquisition device 38 that acquires identification data (driver identification data) of the driver operating the dump truck 20, a dump truck ID acquisition device 40 that acquires identification data (dump truck identification data) of the dump truck 20, and a steering force detection device 33D that detects the steering force that changes the direction of the tires 23T (wheel assemblies 23).

The condition acquisition device 50 also includes an engine control device 32A, a travel control device 32B, a hydraulic control device 32C, and a steering device 32D. The in-vehicle data collection device 30 acquires various operational data of the dump truck 20 from such condition acquisition devices 50 and collects these data as the operational data.

The position detection device 29 includes the GNSS antenna 28B and detects the position of the dump truck 20 on the basis of radio waves received by the antenna 28B. The position data of the dump truck 20 detected by the position detection device 29 is output to the management device 10 via the in-vehicle wireless communication device 27 and the management wireless communication device 18. The position data of the dump truck 20 is also stored in the in-vehicle storage device 31.

The speed detection device 39 includes the rotation sensor 25, and detects the traveling speed (vehicle speed), the acceleration (positive acceleration), and the deceleration (negative acceleration) of the dump truck 20. The acceleration of the dump truck 20 includes an increase in the traveling speed per unit time. The deceleration of the dump truck 20 includes a decrease in the traveling speed per unit time. The traveling speed data of the dump truck 20, the acceleration data of the dump truck 20, and the deceleration data of the dump truck 20 detected by the speed detection device 39 are output to the management device 10 via the in-vehicle wireless communication device 27 and the management wireless communication device 18. The traveling speed data, the acceleration data, and the deceleration data of the dump truck 20 are also stored in the in-vehicle storage device 31.

The load detection device 41 includes the pressure sensors 26, and detects the load acting on the tires 23T. The load data acting on the tires 23T of the dump truck 20 detected by the load detection device 41 is output to the management device 10 via the in-vehicle wireless communication device 27 and the management wireless communication device 18. The load data acting on the tires 23T is also stored in the in-vehicle storage device 31.

The load detection device 41 acquires the pressures acting on the hydraulic oil in the suspension cylinders 24 detected by the pressure sensors 26 to acquire the weight data of the load placed on the vessel 22. The suspension cylinders 24 are provided on the respective wheel assemblies 23. The pressure sensors 26 are provided for the respective suspension cylinders 24. The load detection device 41 acquires the weight data (load data) of the load on the basis of detection signals from the pressure sensors 26 provided for the respective suspension cylinders 24.

The load detection device 41 can also detect whether or not a load is present on the vessel 22 of the dump truck 20 on the basis of changes in the pressures acting on the hydraulic oil in the suspension cylinders 24 detected by the pressure sensors 26. The load detection device 41 can also detect whether a load is to be discharged from the vessel 22, a load is being discharged therefrom, or a load has been discharged therefrom on the basis of changes in the pressures acting on the hydraulic oil in the suspension cylinders 24 detected by the pressure sensors 26.

Specifically, in the present embodiment, the load acting on the tires 23T changes on the basis of the load placed on the vessel 22. The load detection device 41 can detect the load acting on the tires 23T that changes according to the weight of the load on the vessel 22. The load detection device 41 can detect whether or not a load is present on the vessel 22. The load detection device 41 can detect the load acting on the tires 23T when a load is present on the vessel 22 and the load acting on the tires 23T when no load is present on the vessel 22.

When the pressures detected by the pressure sensors 26 have increased and exceeded a predetermined value (a value corresponding to a half of a specified load capacity of the dump truck 20, for example), the load detection device 41 can determine that the dump truck 20 is being loaded at the loading site LPA. When the pressures detected by the pressure sensors 26 have decreased and become lower than a predetermined value (a value corresponding to ¼ of the specified load capacity of the dump truck 20, for example), the load detection device 41 can determine that the dump truck 20 is being unloaded (or has been unloaded) at the soil discharging site DPA. Determination of unloading or loading using the operation condition (operation position or operation amount) of a dump lever 33C, the position data of the dump truck 20, or the like, for example in combination with using the pressures detected by the pressure sensors 26 can improve the accuracy of determination of the condition of loading the vessel 22. Note that unloading operation may be determined on the basis of the operation condition of the dump lever 33C alone.

The in-vehicle data collection device 30 can obtain the loads acting on the respective tires 23T (wheel assemblies 23) from above of the suspension cylinders 24 by acquiring the pressures acting on the hydraulic oil in the suspension cylinders 24 detected by the pressure sensors 26. The loads of structures between the suspension cylinders 24 and the associated wheel assemblies 23 applied on the respective wheel assemblies 23 can be obtained by distributing the masses of the structures to the respective wheel assemblies 23. The load acting on each wheel assembly 23 is a sum of the load of the structure mentioned above applied on the wheel assembly 23 and the load acting on the wheel assembly 23 from above the suspension cylinder 24. The in-vehicle data collection device 30 obtains the loads acting on the respective wheel assemblies 23 and stores the loads as operational data in the in-vehicle storage device 31.

The driver ID acquisition device 38 acquires the driver identification data for identifying the driver of the dump truck 20. The dump truck 20 may be driven by multiple drivers in shifts. The driver identification data can be acquired from an ID key (an electronic key in which the driver identification data is stored) of an individual driver or an ID card (a card in which the driver identification data is stored) of an individual driver, for example. In this case, a magnetic reader, a wireless communication device or the like is used for the driver ID acquisition device 38. Alternatively, a fingerprint authentication device may be provided as the driver ID acquisition device 38 to conduct fingerprint authentication of the fingerprint of an individual driver with fingerprints of drivers stored in advance and acquire the driver identification data. Alternatively, the driver identification data can also be acquired by comparing driver identification data (driver identification data such as a personal identification number) input by an individual driver by using an input device with ID data that are stored in advance. As described above, the driver ID acquisition device 38 is an ID key or ID card reader, a fingerprint authentication device, an ID data input device, or the like and may be provided near the driver's seat in the cab of the dump truck 20 or may be provided at a position on the vehicle body 21 close to which the driver comes when reaching the cab. Alternatively, the driver identification data of the drivers getting in the dump trucks 20 may be transmitted from the management device 10 to the dump trucks 20 through radio communication according to the daily production plan of the mine. In this case, the in-vehicle wireless communication device 27 also functions as the driver ID acquisition device 38. The driver who drives a dump truck 20 can be identified by the driver identification data acquired by the driver ID acquisition device 38. The driver identification data acquired by the driver ID acquisition device 38 is output to the management device 10 via the in-vehicle wireless communication device 27 and the management wireless communication device 18. The driver identification data acquired by the driver ID acquisition device 38 is also stored in the in-vehicle storage device 31.

The dump truck ID acquisition device 40 acquires the dump truck identification data for identifying the dump truck 20. In a mine, multiple dump trucks 20 operate. Dump truck identification data is assigned to each of the dump trucks 20. The dump truck identification data acquired by the dump truck ID acquisition device 40 is output to the management device 10 via the in-vehicle wireless communication device 27 and the management wireless communication device 18. The dump truck identification data acquired by the dump truck ID acquisition device 40 is also stored in the in-vehicle storage device 31.

The steering device 32D steers steering wheels (the front wheel assemblies 23 in the present embodiment) of the dump truck 20. The steering device 32D includes a hydraulic cylinder that generates steering force to change the direction of the wheel assemblies 23 (tires 23T).

The steering force detection device 33D detects the steering force that changes the direction of the steering wheels (tires 23T). In the present embodiment, the steering force detection device 33D detects the pressure of hydraulic oil in the hydraulic cylinder of the steering device 32D as the steering force. The steering force data detected by the steering force detection device 33D is output to the management device 10 via the in-vehicle wireless communication device 27 and the management wireless communication device 18. The steering force data detected by the steering force detection device 33D is also stored in the in-vehicle storage device 31.

Furthermore, the in-vehicle data collection device 30 can acquire data indicating a fuel injection amount by acquiring a control amount of a fuel injection system (FI) 34F from the engine control device 32A. Data relating to fuel consumption can be obtained from the data indicating the fuel injection amount. The in-vehicle data collection device 30 can also acquire data indicating an operation amount of an accelerator 33A via the engine control device 32A. The operation condition of the driver of the dump truck 20 can be obtained from the data indicating the amount of operation of the accelerator 33A performed by the driver of the dump truck 20. The in-vehicle data collection device 30 can also acquire various data such as the speed, the coolant temperature, and the lubricating oil pressure of the engine 34G from the engine control device 32A. The speed data of the engine 34G is acquired by the rotational speed detected by a rotation sensor or the like attached to an output shaft of the engine 34G, and various data such as the coolant temperature and the lubricating oil pressure are acquired by a temperature sensor or a pressure sensor that is not illustrated.

The in-vehicle data collection device 30 can also acquire various data of a traveling device 37 from the travel control device 32B. In the present embodiment, since the dump truck 20 is of a mechanical drive system, the traveling device 37 includes the torque converter 34TC driven by the engine 34G illustrated in FIG. 3, the transmission 34TM, and the drive shaft 34DS that transmits the driving force from the transmission 34TM to the wheel assemblies 23 illustrated in FIG. 3.

Various data of the traveling device 37 are the speed state switching condition and the output shaft rotational speed of the transmission 34TM, the rotational speed of the drive shaft 34DS, and the like described above, for example. The in-vehicle data collection device 30 can also obtain the operation condition of the driver of the dump truck 20 by acquiring the operation position or the operation amount of a shift lever 33B via the travel control device 32B. The shift lever 33B is used by the driver to instruct the travel control device 32B to move the dump truck 20 forward or backward or to change the traveling speed stage.

The in-vehicle data collection device 30 can further acquire the open/closed state of a hydraulic oil control valve 35 from the hydraulic control device 32C. In this example, the hydraulic oil control valve 35 supplies hydraulic oil discharged from an oil pump 34P driven by operation of the engine 34G to a hoist cylinder (hydraulic cylinder) 36 that tilts the vessel 22 and discharges hydraulic oil from the hoist cylinder 36. The in-vehicle data collection device 30 can thus obtain the tilt state of the vessel 22 on the basis of the open/closed state of the hydraulic oil control valve 35. The vessel 22 is tilted by the operation of the dump lever 33C performed by the driver. Thus, the in-vehicle data collection device 30 can also obtain the tilt state of the vessel 22 by acquiring the operation amount or the operation position of the dump lever 33C via the hydraulic control device 32C.

The in-vehicle storage device 31 is constituted by a RAM (random access memory), a ROM (read only memory), flash memory, a hard disk drive, or the like, or a combination thereof, for example. The in-vehicle storage device 31 stores computer programs describing instructions for collecting the operational data by the in-vehicle data collection device 30 and various set values for operating the management system 1. The in-vehicle data collection device 30 reads out the computer programs, acquires the operational data from the condition acquisition devices at predetermined timing, and temporarily stores the operational data in the in-vehicle storage device 31. In this process, the in-vehicle data collection device 30 may carry out statistical processing for obtaining an average value, a mode, a standard deviation or the like for data of the same item.

As described above, in the present embodiment, the operational data include the position data indicating the position of the dump truck 20, the traveling speed data indicating the traveling speed of the dump truck 20, the acceleration data indicating the acceleration of the dump truck 20, the deceleration data indicating the deceleration of the dump truck 20, the load data indicating the loads acting on the tires 23T, the driver identification data indicating the driver of the dump truck 20, the dump truck identification data indicating the dump truck 20, and the steering force data indicating the steering force that changes the direction of the tires 23T.

Furthermore, in the present embodiment, a timer 42 is connected to the in-vehicle data collection device 30, and the operational data include time point data (time data) measured by the timer 42.

Furthermore, in the present embodiment, the operational data include unloading data, loading data, fuel consumption data, operation history data, and event data. The event data include abnormal driving data, vehicle error data, and specific driving operation data. These operational data are also output to the management device 10 and stored in the in-vehicle storage device 31. Note that the operational data are examples, and the operational data are not limited thereto.

The operational data including the position data indicating the position of the dump truck 20, the traveling speed data indicating the traveling speed of the dump truck 20, the acceleration data indicating the acceleration of the dump truck 20, the deceleration data indicating the deceleration of the dump truck 20, the load data indicating the loads acting on the tires 23T, the driver identification data indicating the driver of the dump truck 20, the dump truck identification data indicating the dump truck 20, and the steering force data indicating the steering force that changes the direction of the tires 23T are output to the management device 10 and stored in the in-vehicle storage device 31 in association with time points (time courses).

In the present embodiment, the operational data collected by the in-vehicle data collection device 31 are stored in association with time points in the in-vehicle storage device 31. The in-vehicle data collection device 30 receives a request signal from the management device 10 via the in-vehicle wireless communication device 27. As a result of receiving the request signal, the in-vehicle data collection device 30 transmits the operational data stored in the in-vehicle storage device 31 to the management device 10 via the in-vehicle wireless communication device 27.

<Travel Path>

Figure 5:
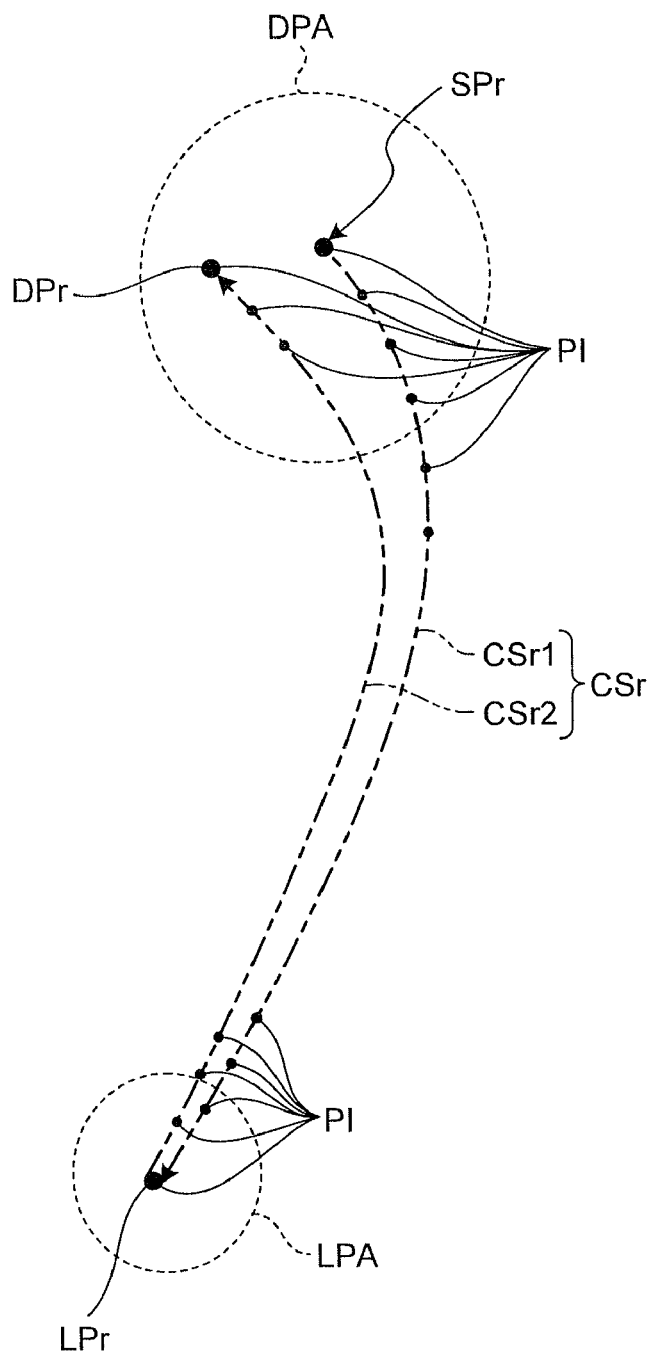
FIG. 5 is a diagram illustrating an example of a travel path of a dump truck according to the present embodiment.

Next, a travel path of the dump truck 20 according to the present embodiment will be described. FIG. 5 is a diagram illustrating an example of the travel path of the dump truck according to the present embodiment. The dump truck 20 travels toward the loading site LPA after being unloaded at the soil discharging site DPA illustrated in FIG. 5. A load is placed on the vessel 22 of the dump truck 20 that has reached the loading site LPA by a mining machine for loading such as a hydraulic excavator. The dump truck 20 on which the load has been placed travels toward the soil discharging site DPA. The dump truck 20 that has reached the soil discharging site DPA is unloaded at the soil discharging site DPA.

The series of operations of the dump truck 20 including starting for the loading site LPA from a predetermined place, being loaded at the loading site LPA, then reaching the soil discharging site DPA, and being unloaded as described above is defined to be one cycle of carrying operation of the dump truck 20. The predetermined place from which the dump truck 20 starts for the loading site LPA will be referred to as a first position, the loading site LPA will be referred to as a second position, and the unloading position in the soil discharging site DPA will be referred to as a third position. In the present embodiment, the first position may be a predetermined position in the soil discharging site DPA or may be a predetermined position different from the soil discharging site DPA.

Within the actual travel path CSr along which the dump truck 20 has traveled in one cycle of carrying operation, a path along which the dump truck 20 has moved from a travel start position SPr that is the first position to a loading position LPr that is the second position in the loading site LPA where the dump truck 20 is loaded will be referred to as an outward path CSr1. In contrast, within the actual travel path CSr, a path along which the dump truck 20 has moved from the loading position LPr that is the second position to the discharging position DPr that is the third position where the dump truck 20 is unloaded in the soil discharging site DPA will be referred to as a homeward path CSr2. The outward path CSr1 starts at the travel start position SPr and ends at the loading position LPr. The homeward path CSr2 starts at the loading position LPr and ends at the discharging position DPr.

The position detection device 29 mounted on the dump truck 20 obtains the position data PI of the dump truck 20 from when the dump truck 20 starts from the travel start position SPr until the dump truck 20 reaches the discharging position DPr after reaching the loading position LPr. The position data PI is data of the position of the dump truck 20 acquired by the GNSS. The position detection device 29 acquires current position data of the dump truck 20 at predetermined time intervals (every one second, for example), for example, and stores the position data in the in-vehicle storage device 31. The group of multiple position data PI (hereinafter referred to as a position data group where appropriate) acquired by the position detection device 29 is included on the actual travel path CSr of the dump truck 20. Thus, the actual travel path CSr can be expressed by multiple position data PI.

<Generation of Reference Travel Path>

Figure 6:
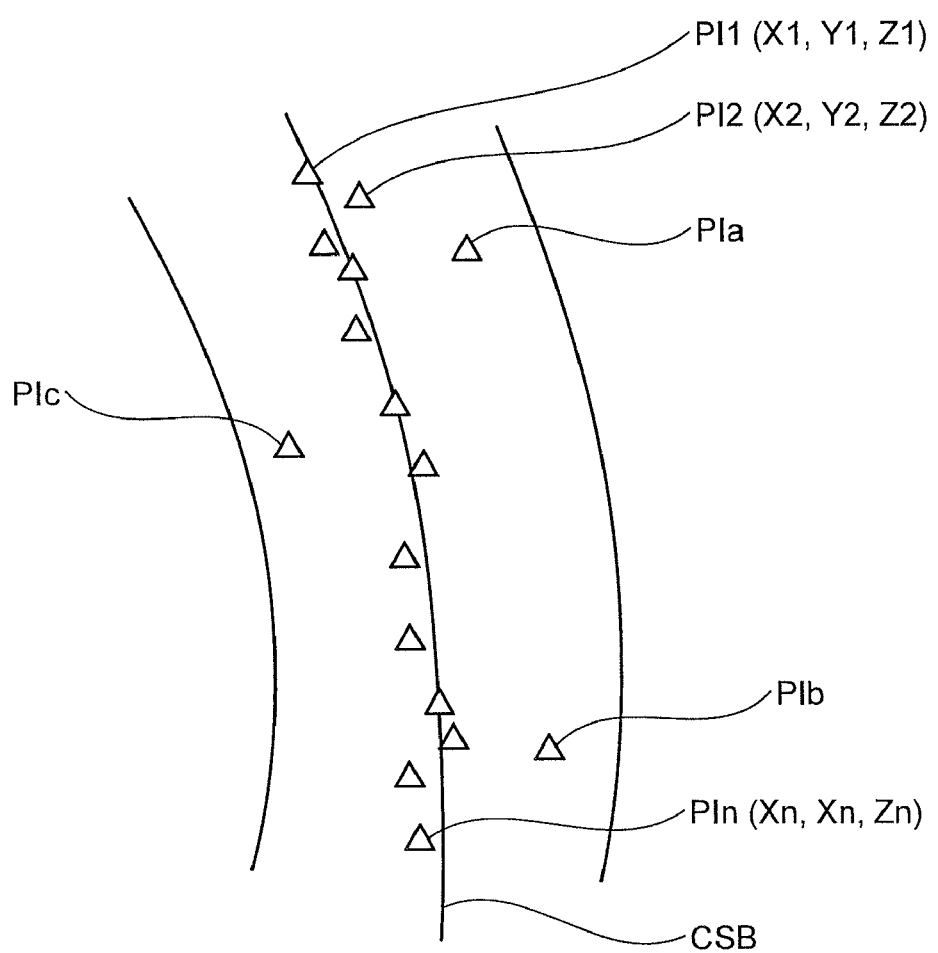
FIG. 6 is a diagram illustrating an example of a reference travel path according to the present embodiment.

FIG. 6 is a diagram illustrating a reference travel path CSB. When the dump truck 20 travels, the wheel assemblies 23 thereof, more specifically, the tires 23T thereof get worn away. Damage to the tires 23T (hereinafter referred to tire damage where appropriate) resulting from traveling is highly correlated with the traveling speed of the dump truck 20, the loads acting on the tires 23T, and the radius of curvature of a curve on the actual travel path CSr along which the dump truck 20 has traveled. Thus, data of the travel path along which the dump truck 20 has traveled is necessary for the estimation unit 12*b* of the management device 10 illustrated in FIG. 2 to estimate the tire damage.

In some mines, the travel path along which the dump truck 20 travels is constructed according to travel path data based on a plan. In other mines, however, there is no travel path data based on a plan. Furthermore, the travel path of the dump truck 20 may be changed depending on the progress of mining of ores. Thus, in a mine, the shape of the travel path may not be acquired even when the position data PI of the dump truck 20 are obtained.

In the present embodiment, the travel path computation unit 12a of the management device 10 illustrated in FIG. 2 acquires the position data PI of the dump truck 20 obtained by the GNSS from the dump truck 20. The travel path computation unit 12a then generates an approximate curve from the acquired multiple position data PI by using the least squares method, for example. The approximate curve is defined as the reference travel path. In the example illustrated in FIG. 6, the travel path computation unit 12a obtains the approximate curve represented by a solid line from multiple position data PI1 (X1, Y1, Z1), PI2 (X2, Y2, Z2), . . . , and PIn (Xn, Yn, Zn) obtained by the GNSS by using the least squares method. The position data PI are three-dimensional position data. The approximate curve is the reference travel path CSB. The obtained reference travel path CSB is stored in the reference travel path database 14CS of the management storage device 13 in the management device 10 illustrated in FIG. 2. The reference travel path CSB is a set of longitude, latitude, and altitude coordinates.

If different dump trucks 20 or the same dump truck 20 travel on the same travel path owing to variation in accuracy specific to the GNSS, a reference travel path CSB of a different shape or radius of curvature may be generated from the obtained position data PI. In this case, different shapes or different curvatures may be obtained for the same corner. Furthermore, when the management device 10 is to acquire, from the dump truck 20, the position data PI acquired by the dump truck 20 from the GNSS, the data amount of the position data PI that can be acquired by the management device 10 is limited owing to the limit of the traffic of communication lines.

Thus, the management device 10 acquires some of the position data PI of the dump truck 20 detected by the position detection device 29 of the dump truck 20 by using the GNSS instead of acquiring all the position data PI to generate the reference travel path CSB. While the position detection device 29 of the dump truck 20 acquires the position data PI from the GNSS on a 0.1-second cycle, the management device 10 acquires the position data PI from the dump truck on a 10-second cycle, for example. As a result, since the data amount of the position data PI acquired by the management device 10 is smaller, the travel path computation unit 12a generates the reference travel path CSB from less position data PI, which may lead to a decrease in the accuracy.

Thus, the travel path computation unit 12a of the management device 10 acquires position data PI at multiple timings from multiple dump trucks 20 operating in the mine, and obtains the reference travel path CSB from the acquired multiple position data PI. As a result, the travel path computation unit 12a can obtain the reference travel path CSB by approximating many position data PI, which can prevent the accuracy of the reference travel path CSB from lowering.

When the travel path computation unit 12a is to generate the reference travel path CSB, PIa, PIb, and PIc that are position data deviated from reference travel path CSB by a predetermined threshold (3 m, for example) or larger are excluded from the approximation using the least squares method. In this manner, the travel path computation unit 12a can improve the accuracy of the generated reference travel path CSB.

As described above, in the present embodiment, the travel path computation unit 12a collects position data PI of the GNSS having a small granularity from multiple dump trucks 20, and creates the shape of the reference travel path CSB from a vague shape of the travel path. In this process, the travel path computation unit 12a assumes that the position data PIa, PIb, and PIc that are largely deviated are data received under poor GNSS reception condition, for example, and removes these data to generate a more reliable reference travel path CSB.

The travel path computation unit 12a collects the position data PI of multiple dump trucks 20 while the dump trucks 20 were traveling from the dump trucks 20 and generates the reference travel path CSB, and can thus determine a travel path along which the dump trucks 20 travel in the mine to be the reference travel path CSB. When the travel path computation unit 12a has newly acquired position data PI of a new travel path from the same dump truck 20 and a different dump truck 20, the travel path computation unit 12a regenerates the reference travel path CSB by also using the newly acquired position data PI. In this manner, even when the travel path of the dump trucks 20 changes as a result of a change in the location of the loading site LPA or the soil discharging site DPA illustrated in FIG. 5 or owing to a presence of an obstacle on the travel path of the dump trucks 20, a reference travel path CSB corresponding to new position data PI can be generated. Consequently, the management system 1 is suitably used in a mine in which travel paths of the dump trucks 20 may be changed frequently.

<Regarding Damaging Operation>

Next, examples of a method for determining a damaging operation and a method for assessing a damage to tires 23T according to the present embodiment will be described. In the present embodiment, whether or not a damaging operation damaging tires 23T mounted on a dump truck 20 has been carried out by the driver is determined by the determination unit 12d.

If it is determined that the damaging operation has been carried out, damaging operation data indicating carrying out of the damaging operation and driver identification data indicating the driver who has carried out the damaging operation are acquired by the data acquisition unit 12e. Association data containing the damaging operation data associated with the driver identification data is output from the data output unit 12f.

Furthermore, if it is determined that the damaging operation has been carried out, the damaging operation data indicating carrying out of the damaging operation and position data indicating the position of the dump truck 20 on which the damaging operation has been carried out are acquired by the data acquisition unit 12e. Association data containing the damaging operation data associated with the position data is output from the data output unit 12f.

In the present embodiment, a damaging operation is a damaging operation carried out when the dump truck 20 is present on the reference travel path. The data acquisition unit 12e acquires the damaging operation data when the dump truck 20 is present on the reference travel path. The data output unit 12f outputs the association data when the dump truck 20 is present on the reference travel path.

In the present embodiment, the damaging operation includes at least one of a rapid deceleration operation of decelerating the dump truck 20 at a given speed (first speed) or higher per unit time, a stationary steering operation of changing the direction of the tires 23T of the dump truck 20 at a given speed (second speed) or lower, and an aggressive cornering operation of making the dump truck 20 travel along a curve on the reference travel path CSB having a radius of curvature of a predetermined value or smaller at a given speed (third speed) or higher.

The damaging operation is highly correlated with the traveling speed of the dump truck 20. The determination unit 12d can determine whether or not the damaging operation has been carried out on the basis of a detection signal from the speed detection device 39.

Furthermore, in the present embodiment, the amount of damage DM to tires 23T is estimated on the basis of the operational data by the estimation unit 12b. The damage amount DM includes the wear amount of the tires 23T. Whether or not the damaging operation damaging the tires 23T is carried out is determined on the basis of the estimated damage amount DM.

(First Aspect of Damaging Operation: Rapid Deceleration Operation)

A determination method for determining whether or not a rapid deceleration operation has been carried out among the damaging operations will be described. The rapid deceleration operation is an operation of decelerating the dump truck 20 by a given speed (first speed) or higher per unit time. In other words, the rapid deceleration operation is an operation of decelerating the dump truck 20 at a given deceleration or higher. The rapid deceleration operation is an operation of deceleration at 10 km/h or higher per second, for example. The estimation unit 12b estimates the amount of damage DM1 to the tires 23T caused by the rapid deceleration operation on the basis of deceleration data indicating the deceleration (the decrease in the traveling speed per unit time) of the dump truck 20 and load data indicating the load acting on the tires 23T.

When the amount of damage to the tires 23T caused by the rapid deceleration operation is represented by DM1, the deceleration of the dump truck 20 is represented by A, and the load acting on the tires 23T is represented by LD, the relation of the following expression (1) is satisfied.

$$DM1 \propto LD \times A \qquad (1)$$

In the present embodiment, the estimation unit 12b calculates the expression (1) to estimate the amount of damage DM1 caused by the rapid deceleration operation.

The determination unit 12d determines whether or not the rapid deceleration operation has been carried out on the basis of the damage amount DM1 estimated by the estimation unit 12b. If the damage amount DM1 is determined to be equal to or larger than a preset first threshold, the determination unit 12d determines that the rapid deceleration operation has been carried out. If the damage amount DM1 is determined not to exceed the preset first threshold, the determination unit 12d determines that the rapid deceleration operation has not been carried out.

In this manner, the determination unit 12d determines whether or not the rapid deceleration operation has been carried out on the basis of the deceleration data indicating the deceleration A of the dump truck 20 and the load data indicating the load LD acting on the tires 23T.

Furthermore, as expressed by the expression (1), the estimation unit 12b estimates the amount of damage DM1 caused by the rapid deceleration operation on the basis of the deceleration data indicating the deceleration A of the dump truck 20 and the load data indicating the load LD acting on the tires 23T.

(Second Aspect of Damaging Operation: Stationary Steering Operation)

A determination method for determining whether or not a stationary steering operation has been carried out among the damaging operations will be described. The stationary steering operation is an operation of changing the direction of the tires 23T at a given speed (second speed) or lower. The stationary steering operation is an operation of changing the direction of the tires 23T when the traveling speed of the dump truck 20 is 1 km/h or lower, for example. The stationary steering operation also includes an operation of changing the direction of the tires 23T in a state in which the dump truck 20 is stopped (in a state in which the traveling speed is 0 km/h). The estimation unit 12b estimates the amount of damage DM2 to the tires 23T caused by the stationary steering operation on the basis of load data indicating the load acting on the tires 23T.

When the amount of damage to the tires 23T caused by the stationary operation is represented by DM2 and the load acting on the tires 23T is represented by LD, the relation of the following expression (2) is satisfied.

$$DM2 \propto LD \qquad (2)$$

In the present embodiment, the estimation unit 12b calculates the expression (2) to estimate the amount of damage DM2 caused by the stationary steering operation.

Whether or not the stationary steering operation has been carried out is determined on the basis of steering force data indicating steering force. The steering force of a steering operation when the traveling speed of the dump truck 20 is low (including zero) is larger than the steering force of a steering operation when the traveling speed of the dump truck 20 is high. Specifically, the stationary steering operation requires a larger steering force than that of steering while the dump truck 20 is traveling. In the present embodiment, it is determined that the stationary steering operation has been carried out if the steering force detected by the steering force detection device 33D exceeds a preset threshold. If the pressure of hydraulic oil in the hydraulic cylinder of the steering device 32D has exceeded 5000 kPa, for example, it is determined that the stationary steering operation has been carried out.

In this manner, in the present embodiment, the determination unit 12d determines whether or not the stationary steering operation has been carried out on the basis of traveling speed data indicating the traveling speed of the dump truck 20 and the steering force data indicating the steering force.

Furthermore, as expressed by the expression (2), the estimation unit 12b estimates the amount of damage DM2 caused by the stationary steering operation on the basis of load data indicating the load LD acting on the tires 23T.

(Third Aspect of Damaging Operation: Aggressive Cornering Operation)

A determination method for determining whether or not an aggressive cornering operation has been carried out among the damaging operations will be described. The aggressive cornering operation is an operation of making the dump truck 20 travel along a curve on the reference travel path CSB having a radius of curvature of a predetermined value or smaller at a given speed (third speed) or higher. The aggressive cornering operation is an operation of making the dump truck 20 travel along a curve having a radius of curvature of 100 m or smaller at 50 km/h or higher, for example. The estimation unit 12b estimates the amount of damage DM3 to the tires 23T caused by the aggressive cornering operation on the basis of traveling speed data indicating the traveling speed of the dump truck 20, load data indicating the load acting on the tires 23T and the radius of curvature of the curve.

When the amount of damage to the tires 23T caused by the aggressive cornering operation is represented by DM3, the traveling speed of the dump truck 20 is represented by V, the load acting on the tires 23T is represented by LD, and the radius of curvature of the curve is represented by R, the relation of the following expression (3) is satisfied.

$$DM3 \propto (LD \times V^2)/R \qquad (3)$$

In the present embodiment, the estimation unit 12b calculates the expression (3) to estimate the amount of damage DM3 caused by the aggressive cornering operation.

The determination unit 12d determines whether or not the aggressive cornering operation has been carried out on the basis of the damage among DM3 estimated by the estimation unit 12b. If the damage amount DM3 is determined to be equal to or larger than a preset third threshold, the determination unit 12d determines that the aggressive cornering operation has been carried out. If the damage amount DM3 is determined not to exceed the preset third threshold, the determination unit 12d determines that the aggressive cornering operation has not been carried out.

In this manner, the determination unit 12d determines whether or not the aggressive cornering operation has been carried out on the basis of the traveling speed data indicating the traveling speed V of the dump truck 20, the load data indicating the load LD acting on the tires 23T, and the radius of curvature R of the curve.

Furthermore, as expressed by the expression (3), the estimation unit 12b estimates the amount of damage DM3 caused by the aggressive cornering operation on the basis of the traveling speed data indicating the traveling speed V of the dump truck 20, the load data indicating the load LD acting on the tires 23T, and the radius of curvature R of the curve.

Figure 7:
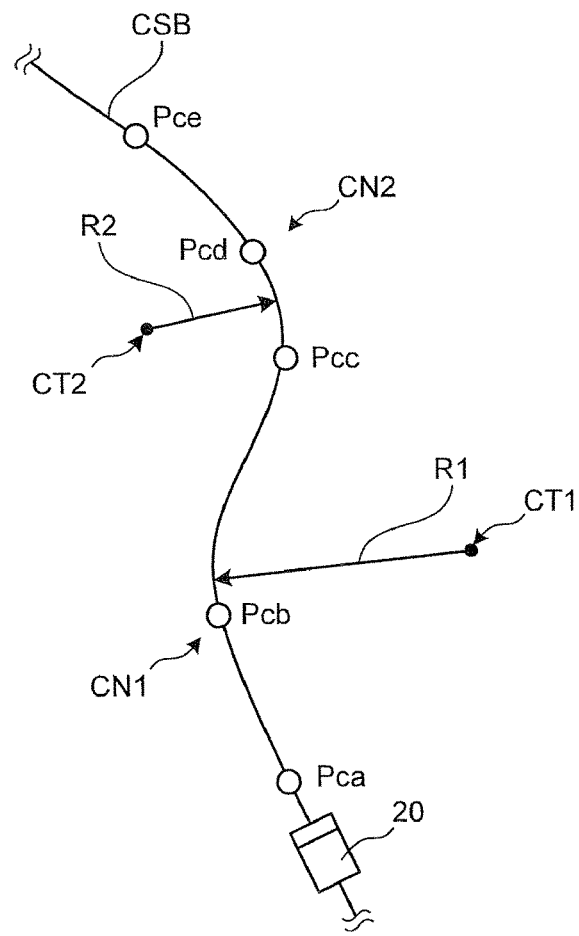
FIG. 7 is a diagram illustrating an example of the reference travel path according to the present embodiment.

FIG. 7 is a diagram illustrating an example of a method for estimating the amount of damage DM3 to the tires 23T caused by the aggressive cornering operation. As illustrated in FIG. 7, curves CN (CN1, CN2) are provided on the reference travel path CSB.

The reference travel path CSB illustrated in FIG. 7 includes a curve CN1 having a radius of curvature R1 around a position CT1, and a curve CN2 having a radius of curvature R2 around a position CT2. The reference travel path CSB also includes direction data. When the dump truck 20 has traveled along the reference travel path CSB illustrated in FIG. 7, the estimation unit 12b reads out the reference travel path CSB, more specifically, coordinates of position data Pca, Pcb, Pcc, Pcd, and Pce included in the reference travel path CSB from the reference travel path database 14CS so as to estimate the amount of damage DM3 to the tires 23T caused by the aggressive cornering operation.

When the position data Pca, Pcb, Pcc, Pcd, and Pce of the reference travel path CSB are not to be distinguished from one another, the position data will be referred to as position data Pc. The data of the reference travel path CSB stored in the reference travel path database 14CS contains the position data Pc mentioned above, and the radii of curvature R1 and R2 of the curves CN1 and CN2 of the reference travel path CSB.

Furthermore, in order to estimate the amount of damage DM3 to the tires 23T of the dump truck 20, the estimation unit 12b reads out the position data PI, the speed data, and the load LD on the tires 23T of the dump truck 20 for which the damage DM3 is to be estimated and which has traveled along the reference travel path CSB from the operational database 14I. The speed data of the dump truck 20 is the actual traveling speed when the dump truck 20 traveled along the reference travel path CSB.

The estimation unit 12b determines the position of the reference travel path CSB along which the dump truck 20 has traveled from the position data PI of the dump truck 20 and the position data Pc of the reference travel path CSB. From the position of the reference travel path CSB along which the dump truck 20 has traveled, it is determined whether the dump truck 20 has traveled along the curve CN1 or CN2 of the reference travel path CSB or along a straight part thereof. If the dump truck 20 has traveled along the curve CN1, for example, the estimation unit 12b obtains the damage amount DM3 by substituting the radius of curvature R1 of the curve CN1 of the reference travel path CSB, the traveling speed V of the dump truck 20 when the dump truck 20 was traveling along the curve CN1, and the load LD acting on the tires 23T into the expression (3). The damage amount DM3 is obtained for each of the tires 23T of the dump truck 20.

As can be seen in the expression (3), if the radius of curvature R of a curve CN of the reference travel path CSB is infinite, the damage amount DM3 becomes 0. Since the radius of curvature R of a curve CN of the reference travel path CSB is infinite at a straight part thereof, the damage amount DM3 becomes 0 at the straight part. The estimation unit 12b obtains the damage DM3 to the dump truck 20 that has traveled along the reference travel path CSB over the entire reference travel path CSB, for example, and adds the obtained damages DM3 for each tire 23T. The resulting value is referred to as an accumulated damage amount. Since the damage accumulated on the tire 23T is shown by the accumulated damage amount, the wear amount of the tire 23T is estimated.

The accumulated damage amount obtained by the estimation unit 12b is calculated for each dump truck 20 or for each driver of the dump trucks 20. When the accumulated damage amount is to be calculated for each driver, the accumulated damage amount is calculated for each piece of driver identification data assigned to each driver. The driver identification data is acquired by the driver ID acquisition device 38 illustrated in FIG. 4, and transmitted to the management device 10 illustrated in FIG. 2 via the in-vehicle wireless communication device 27. As a result of calculating the accumulated damage amount for each driver, an accumulated damage amount caused by a driver can be distinguished, and driving guidance can thus be provided to a driver with a large accumulated damage amount, for example.

When the accumulated damage amount is to be calculated for each dump truck 20, the accumulated damage amount is calculated for each piece of dump truck identification data assigned to each dump truck 20. The dump truck identification data is acquired by the dump truck ID acquisition device 40 illustrated in FIG. 4, and transmitted to the management device 10 illustrated in FIG. 2 via the in-vehicle wireless communication device 27. As a result of calculating the accumulated damage amount for each dump truck 20, an accumulated damage amount caused by a dump truck 20 can be distinguished, and a dump truck 20 with a large accumulated damage amount can thus be improved, for example.

The estimation unit 12b may estimate the damage amount DM3 over the entire path from the travel start position SPr illustrated in FIG. 5 from which the dump truck 20 has started and to the loading position LPr to which the dump truck 20 has moved and where the dump truck 20 is loaded, or may estimate the damage amount DM3 over the entire path from the loading position LPr from which the dump truck 20 has started and to the discharging position DPr to which the dump truck 20 has moved and where the dump truck 20 is unloaded. Alternatively, the estimation unit 12b may estimate the damage amount DM3 over the entire path from the travel start position SPr illustrated in FIG. 5 from which the dump truck 20 has started and to the discharging position DPr to which the dump truck 20 has moved and where the dump truck 20 is unloaded via the loading position LPr where the dump truck 20 is loaded.

Figure 8:
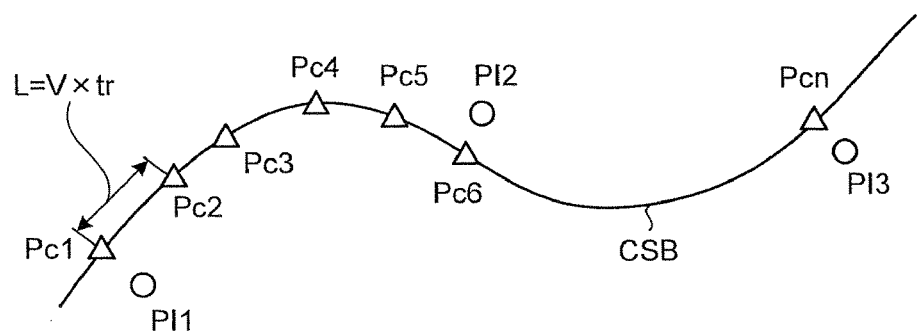
FIG. 8 is a diagram illustrating an example of a travel distance of a dump truck obtained by using the reference travel path according to the present embodiment.

FIG. 8 is a diagram for explaining an example of obtaining a travel distance of the dump truck 20 by using the reference travel path CSB. The estimation unit 12b can obtain the position data Pc1, Pc2, ..., Pcn (n is an integer of 1 or larger) of the dump truck 20 on the reference travel path CSB from the position data PI1, PI2, and PI3 of the dump truck 20 and the traveling speed V of the dump truck 20. When the position data Pc1, Pc2, ..., Pcn are not to be distinguished from one another, the position data will be referred to as position data Pc where appropriate.

The position data PI1, PI2, and PI3 are acquired on a t1-second cycle by the in-vehicle data collection device 30 of the dump truck 20, and the traveling speed V is acquired on a t2-second cycle smaller than t1 second, for example. The position data PI1, PI2, and PI3 and the traveling speed V are transmitted to the management device 10 from the dump truck 20, and stored in the operation information database 14I of the management storage device 13 in the management device 10. The position data PI1, PI2, and PI3 of the dump truck 20 are acquired by the GNSS.

The estimation unit 12b reads out the position data PI1, PI2, and PI3 from the operation information database 14I. The estimation unit 12b selects position data Pc1, Pc6, and Pcn on the reference travel path CSB that are closest to the position data PI1, PI2, and PI3 of the dump truck 20. The successive position data PI1, PI2, and PI3 of the dump truck 20 are acquired successively at t1-second intervals. The dump truck 20 can be assumed to be traveling along the reference travel path CSB while the position data PI1, PI2, and PI3 can be acquired. The estimation unit 12b can thus obtain the travel distance L from the traveling speed V and the traveling time tr of the dump truck 20. The estimation unit 12b can obtain the position data Pc2, Pc3, Pc4, and Pc5 of the dump truck 20 on the reference travel path CSB by using the travel distance L.

For example, coordinates of a position at a travel distance L ahead along the reference travel path CSB from the position data Poi on the reference travel path CSB corresponding to the position data PI1 of the dump truck 20 are the position data Pc2 of the dump truck on the reference travel path CSB. Similarly, coordinates of a position at a travel distance L ahead along the reference travel path CSB from Pc2 are the position data Pc3 of the dump truck on the reference travel path CSB. Since the number of position data PI1, PI2, and PI3 of the dump truck 20 acquired by the GNSS can be reduced in this manner, the load on communication lines can be reduced.

The operational data of the dump truck 20 acquired by the management device 10 may be missing for some reason. In comparing the frequency distribution of the traveling speed V among multiple dump trucks 20, for example, during one cycle from loading to unloading of a dump truck 20, it is difficult to carry out comparison between a normal dump truck and a dump truck 20 whose operational data is missing. Even when the management device 10 cannot successfully acquire the position data PI of the dump truck 20 acquired by the GNSS and the traveling speed V of the dump truck 20, the position data PI of the dump truck 20 can be estimated on the assumption that the dump truck 20 has been traveling along the reference travel path CSB.

If the traveling speed V is missing, for example, it is assumed that the dump truck 20 has traveled between the position data PI immediately before the traveling speed V is lost and the position data PI immediately after the traveling speed V is recovered along the reference travel path CSB at a constant speed or at an average traveling speed over one cycle. On this assumption, the management processing device 12 of the management device 10 obtains the travel distance from the traveling time tr and the assumed traveling speed of the dump truck 20 on the basis of the position data Pc on the reference travel path CSB that is closest to the position data PI immediately before the traveling speed V is lost. The management processing device 12 then determines a position at the aforementioned travel distance away from the position data Pc, on which the travel distance is based, along the reference travel path CSB to be one piece of the missing position data of the dump truck 20. As a result of sequentially repeating this process, the position data PI of the dump truck 20 while the traveling speed V is missing can be obtained.

If the position data PI of the dump truck 20 is missing owing to poor GNSS reception condition, for example, it is assumed that the dump truck 20 has traveled between the position data PI immediately before the position data PI is lost and the position data PI immediately after the position data PI is recovered along the reference travel path CSB at a constant speed or at an average traveling speed over one cycle. On this assumption, the management processing device 12 of the management device 10 obtains the travel distance from the traveling time tr and the assumed traveling speed of the dump truck 20 on the basis of the position data Pc on the reference travel path CSB that is closest to the position data PI immediately before the position data PI is lost. The management processing device 12 then determines a position at the aforementioned travel distance away from the position data Pc, on which the travel distance is based, along the reference travel path CSB to be one piece of the missing position data of the dump truck 20. As a result of sequentially repeating this process, the position data PI of the dump truck 20 while the position data PI is missing can be obtained.

In this manner, even when the position data PI of the dump truck 20 is not sufficient or when the position data PI is missing, the management device 10 can obtain the position data PI of the position where the position data PI is absent by using the reference travel path CSB.

<Management Method>

Figure 9:
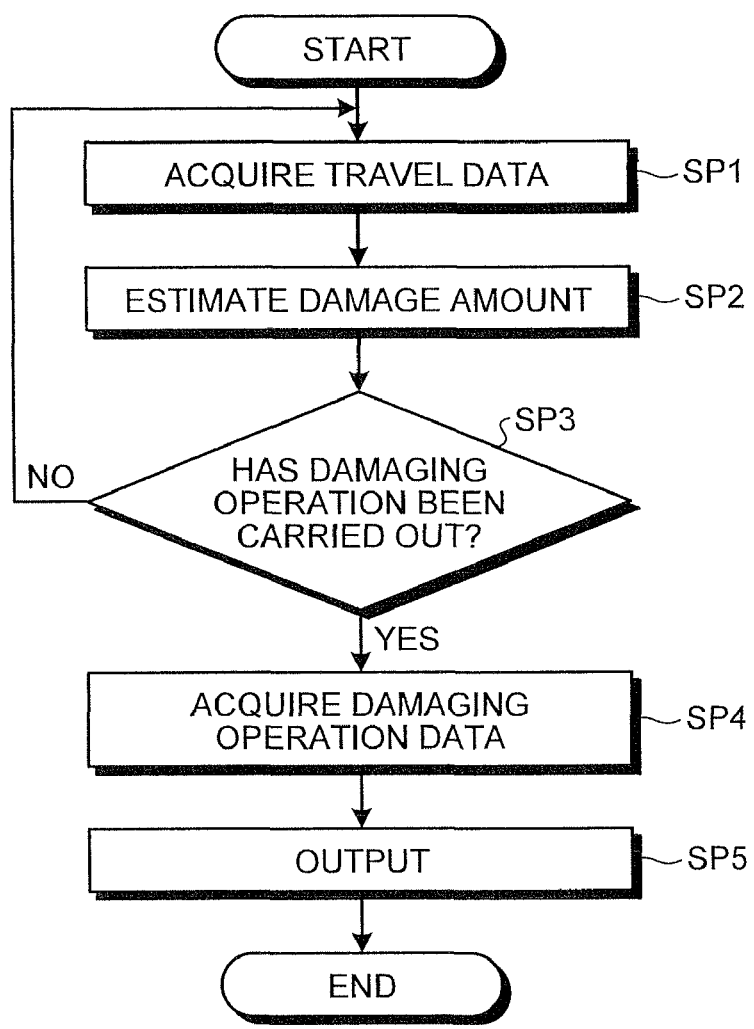
FIG. 9 is a flowchart illustrating an example of a management method according to the present embodiment.

Next, an example of a method for managing a dump truck 20 according to the present embodiment will be described. FIG. 9 is a flowchart illustrating an example of the management method according to the present embodiment. In the following description, the rapid deceleration operation, the stationary steering operation, and the aggressive cornering operation will be collectively referred to as damaging operations where appropriate. Furthermore, in the following description, the damage amount DM1 caused by the rapid deceleration operation, the damage amount DM2 caused by the stationary steering operation, and the damage amount DM3 caused by the aggressive cornering operation will be collectively referred to as damage amounts DM where appropriate.

The data acquisition unit 12d of the management processing device 12 acquires the operational data of the dump truck 20 (step SP1). The estimation unit 12b estimates the amount of damage DM to the tires 23T on the basis of at least part of the acquired operational data (step SP2).

The determination unit 12d determines whether or not a damaging operation has been carried out (step SP3). As described above, in the present embodiment, if the damage amount DM1 estimated by the estimation unit 12b is determined to be equal to or larger than the preset first threshold, it is determined that the rapid deceleration operation among the damaging operations has been carried out. If the traveling speed of the dump truck 20 is equal to or lower than the second speed and the steering force exceeds the preset threshold, it is determined that the stationary steering operation among the damaging operations has been carried out. If the damage amount DM3 estimated by the estimation unit 12b is determined to be equal to or larger than the preset third threshold, it is determined that the aggressive cornering operation among the damaging operations has been carried out.

If it is determined that a damaging operation has been carried out (step SP3: Yes), the data acquisition unit 12e acquires the damaging operation data indicating carrying out of the damaging operation and the driver identification data indicating the driver who has carried out the damaging operation (step SP4).

If it is determined that the damaging operation has not been carried out, (step SP3: No), the process returns to step SP1.

The damaging operation data includes presence/absence data of the damaging operation. The damaging operation data includes the number-of-times data indicating the number of times the damaging operation has been carried out.

When the damaging operation data is rapid deceleration operation data indicating carrying out of the rapid deceleration operation, for example, the rapid deceleration operation data contains the number-of-times data indicating the number of times the rapid deceleration operation has been carried out. In the present embodiment, the rapid deceleration operation data further contains the damage amount DM1 estimated by the estimation unit 12b.

When the damaging operation data is stationary steering operation data indicating carrying out of the stationary steering operation, the stationary steering operation data contains the number-of-times data indicating the number of times the stationary steering operation has been carried out. In the present embodiment, stationary steering operation data further contains the damage amount DM2 estimated by the estimation unit 12b.

When the damaging operation data is aggressive cornering operation data indicating carrying out of the aggressive cornering operation, the aggressive cornering operation data contains the number-of-times data indicating the number of times the aggressive cornering operation has been carried out. In the present embodiment, the aggressive cornering operation data further contains the damage amount DM3 estimated by the estimation unit 12b.

After the damaging operation data and the driver identification data are acquired by the data acquisition unit 12e, the data output unit 12f outputs association data containing the damaging operation data associated with the driver identification data (step SP5). Specifically, the data output unit 12f outputs the driver identification data indicating the driver who has carried out the damaging operation in association with the damaging operation data (number-of-times data).

The data output unit 12f outputs the association data to the output device 16. The output device 16 includes one or both of the display device 16A and the printing device 16B. The display device 16A displays the association data output by the data output unit 12f. The printing device 16B prints the association data output by the data output unit 12f.

Herein, an example in which the data acquisition unit 12e acquires the damaging operation data and the driver identification data and the data output unit 12f outputs the association data containing the driver identification data and the damaging operation data associated with each other has been described.

The data acquisition unit 12e can acquire the damaging operation data indicating carrying out of a damaging operation and the position data indicating the position of the dump truck 20 on which the damaging operation has been carried out. The data acquisition unit 12e can acquire the position data from the position detection device 29. The data output unit 12f can output association data containing the damaging operation data associated with the position data. The output device 16 outputs (makes visible) the association data containing the position data and the damaging operation data associated with each other.

The data acquisition unit 12e may acquire the damaging operation data indicating carrying out of a damaging operation, the driver identification data indicating the driver who has carried out the damaging operation, and the position data indicating the position of the dump truck 20 on which the damaging operation has been carried out. The data output unit 12f may output association data containing the damaging operation data, the driver identification data, and the position data that are associated with one another.

Furthermore, the data acquisition unit 12e may acquire the damaging operation data, one or both of the driver identification data and the position data, the dump truck identification data indicating the dump truck 20 on which the damaging operation has been carried out. The data output unit 12f may output association data containing the damaging operation data, one or both of the driver identification data and the position data, and the dump truck identification data that are associated with one another.

Furthermore, the data acquisition unit 12e may acquire the damaging operation data, one or both of the driver identification data and the position data, and the time point data indicating the time point at which the damaging operation was carried out. The data output unit 12f may output association data containing the damaging operation data, one or both of the driver identification data and the position data, and the time point data that are associated with one another.

The damaging operation data may be an accumulated damage amount obtained by obtaining damage amounts DM over the entire reference travel path CSB and adding the damage amounts for each tire 23T. The accumulated damage amount may be an accumulated damage amount of the damage amounts DM1, an accumulated damage amount of the damage amounts DM2, or an accumulated damage amount of the damage amounts DM3. Since the damage accumulated on the tire 23T is shown by the accumulated damage amount, the wear amount of the tire 23T is estimated. In the present embodiment, the damage amount DM includes the wear amount of tires 23T.

The accumulated damage amounts may be calculated for each driver of the dump trucks 20 or for each dump truck 20. When the accumulated damage amount is to be calculated for each driver, the accumulated damage amount is calculated for each piece of driver identification data assigned to each driver. The driver identification data is acquired by the driver ID acquisition device 38 and transmitted to the management device 10 via the in-vehicle wireless communication device 27. As a result of calculating the accumulated damage amount for each driver, an accumulated damage amount caused by a driver can be distinguished, and driving guidance can thus be provided to a driver with a large accumulated damage amount, for example.

When the accumulated damage amount is to be calculated for each dump truck 20, the accumulated damage amount is calculated for each piece of dump truck identification data assigned to each dump truck 20. The dump truck identification data is acquired by the dump truck ID acquisition device 40 and transmitted to the management device 10 via the in-vehicle wireless communication device 27. As a result of calculating the accumulated damage amount for each dump truck 20, an accumulated damage amount caused by a dump truck 20 can be distinguished, and a dump truck 20 with a large accumulated damage amount can thus be improved, for example.

The estimation unit 12b may estimate the damage amount DM over the entire path from the travel start position SPr illustrated in FIG. 5 from which the dump truck 20 has started and to the loading position LPr to which the dump truck 20 has moved and where the dump truck 20 is loaded, or may estimate the damage amount DM over the entire path from the loading position LPr from which the dump truck 20 has started and to the discharging position DPr to which the dump truck 20 has moved and where the dump truck 20 is unloaded. Alternatively, the estimation unit 12b may estimate the damage amount DM over the entire path from the travel start position SPr illustrated in FIG. 5 from which the dump truck 20 has started and to the discharging position DPr to which the dump truck 20 has moved and where the dump truck 20 is unloaded via the loading position LPr where the dump truck 20 is loaded.

<Example Output of Output Device>

Next, example outputs of the output device 16 according to the present embodiment will be described with reference to FIGS. 10 to 23. In the present embodiment, the output device 16 outputs the association data output by the data output unit 12f in the form of a report. The output device 16 displays or prints the report of the association data created by the data output unit 12f to make the report visible.

Hereinafter, examples of a display screen of the display device 16A will be described with reference to FIGS. 10 to 23. Note that the examples illustrated in FIGS. 10 to 23 may be printed matters printed by the printing device 16B.

FIGS. 10 to 14 illustrate example outputs of rapid deceleration operation data.

Figure 10:
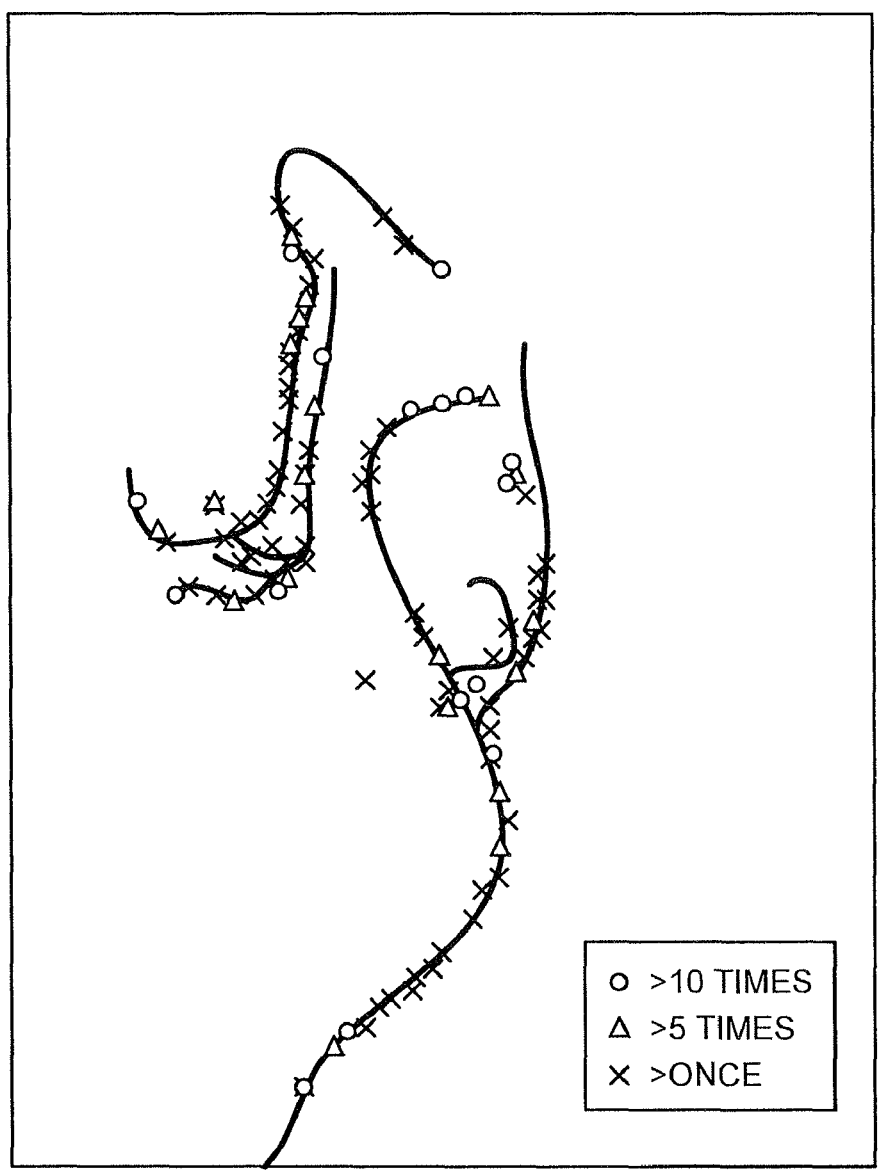
FIG. 10 is a diagram illustrating an example output of an output device according to the present embodiment.

FIG. 10 illustrates the positions at which the rapid deceleration operation has been carried out on the reference travel paths, and the number of times the rapid deceleration operation has been carried out at the positions. The number of times the operation has been carried out is the number of times a month the operation has been carried out, for example.

Figure 11:
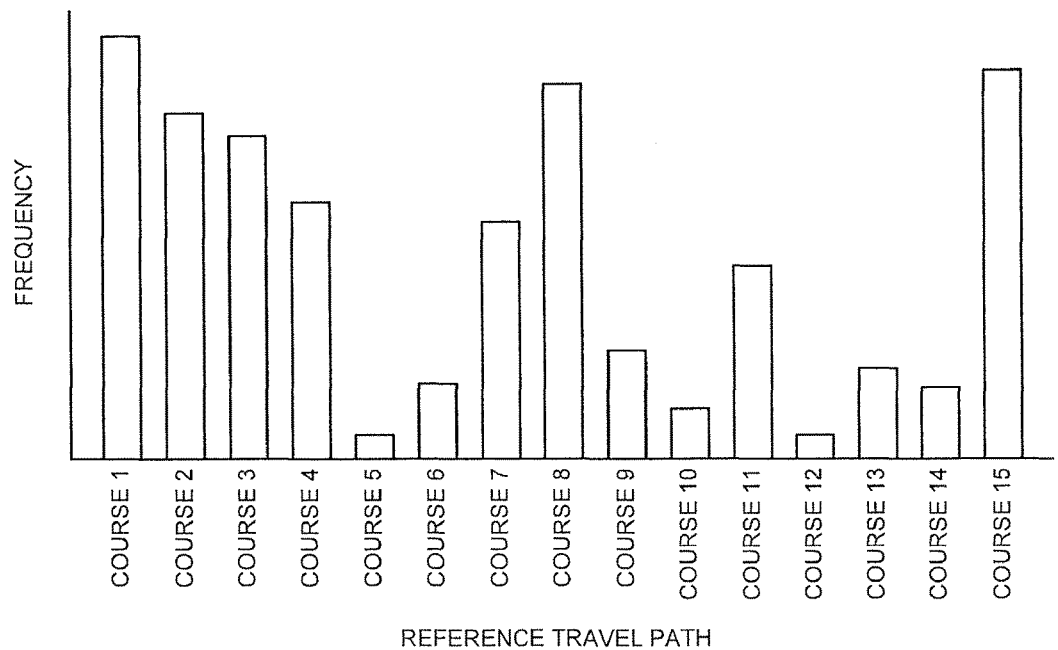
FIG. 11 is a graph illustrating an example output of the output device according to the present embodiment.

FIG. 11 illustrates the relation between multiple generated reference travel paths and the frequency of the rapid deceleration operation carried out on each reference travel path. Typically, multiple loading sites LPA and multiple soil discharging sites DPA are provided in a mine. Thus, multiple reference travel paths that connect the loading sites LPA and the soil discharging sites DPA are generated. The example illustrated in FIG. 11 illustrates the relation between multiple reference travel paths (courses 1 to 15) and the frequency indicating the average value of the numbers of times the rapid deceleration operation has been carried out during one-cycle travel on each course. The horizontal axis represents the courses, and the vertical axis represents the frequency.

Figure 12:
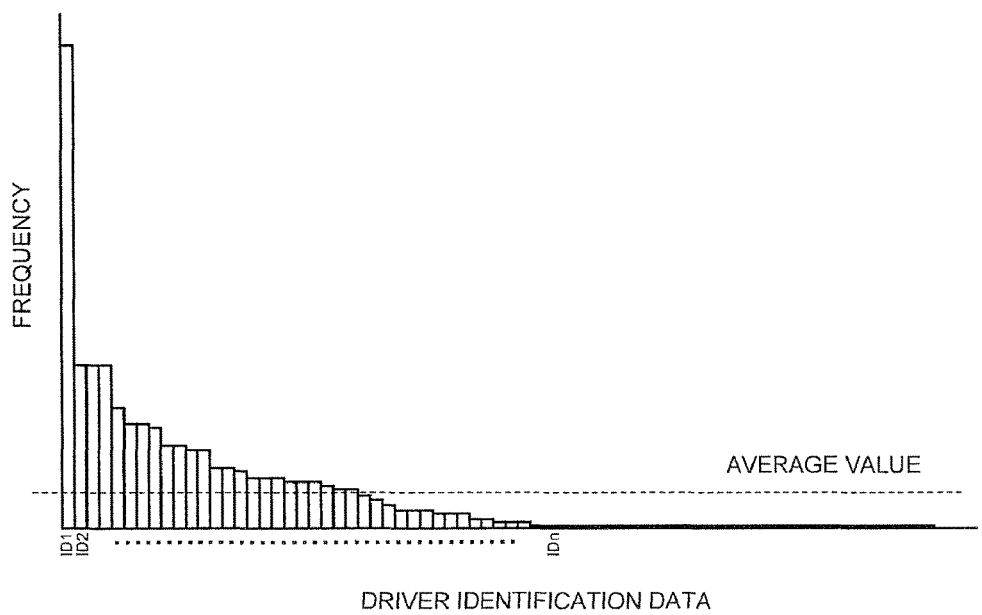
FIG. 12 is a graph illustrating an example output of the output device according to the present embodiment.

FIG. 12 illustrates the relation between the driver identification data of the dump trucks 20 and the frequency of the rapid deceleration operation carried out on the reference travel paths by each driver. The horizontal axis represents multiple drivers, and the vertical axis represents the frequency. As illustrated in FIG. 12, the output device 16 can output association data containing the rapid deceleration operation data (number-of-times data) of the damaging operation data associated with the driver identification data. Furthermore, as illustrated in FIG. 12, an average value of the frequencies may be calculated and output.

Figure 13:
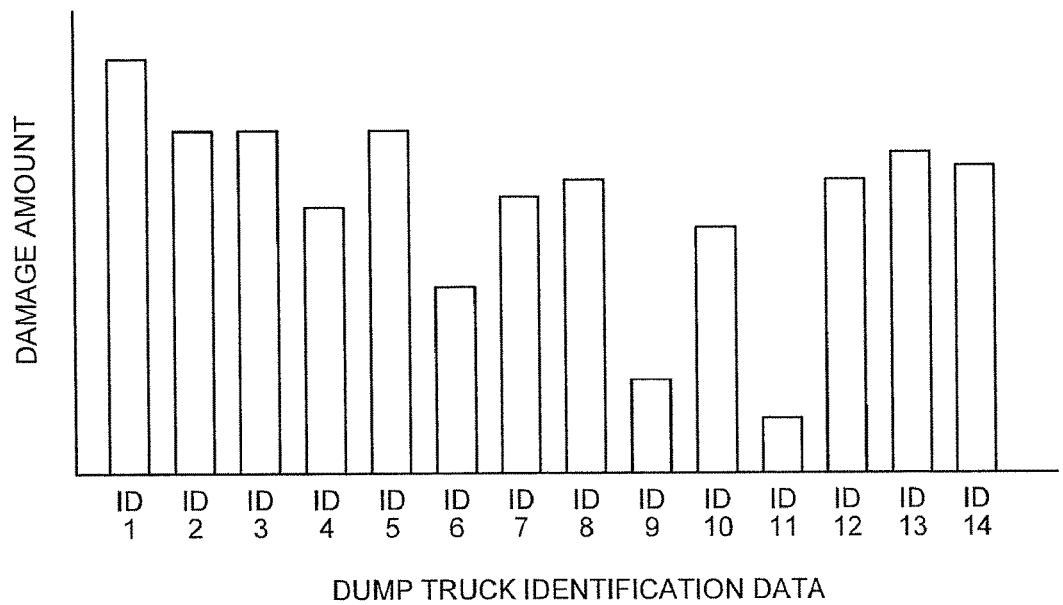
FIG. 13 is a graph illustrating an example output of the output device according to the present embodiment.

FIG. 13 illustrates the relation between the dump truck identification data and the amount of damage DM1 to tires 23T of the dump truck 20 caused by the rapid deceleration operation. The horizontal axis represents multiple dump trucks 20, and the vertical axis represents the accumulated value of damage amounts DM1 caused by multiple rapid deceleration operations. As illustrated in FIG. 13, the output device 16 can output association data containing the rapid deceleration operation data (damage amounts DM1) of the damaging operation data associated with the dump truck identification data. Alternatively, the output device 16 may output damage amounts for each course by replacing the dump truck identification data of the horizontal axis with the courses. As a result, the course on which damage is likely to be caused is shown.

Figure 14:
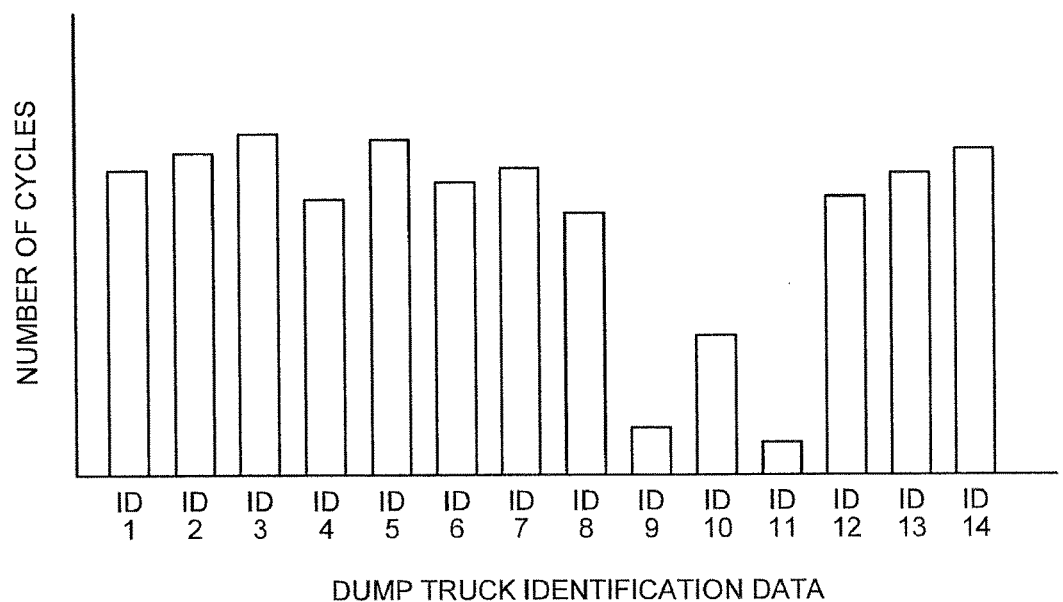
FIG. 14 is a graph illustrating an example output of the output device according to the present embodiment.

FIG. 14 illustrates the relation between the dump truck identification data and the number of cycles of each dump truck 20. As described above, a cycle (one cycle) is a series of operations of the dump truck 20 including starting for the loading site LPA from a predetermined place, being loaded at the loading site LPA, then reaching the soil discharging site DPA, and being unloaded. The number of cycles is a value indicating the number of times the cycle has been carried out. As the number of cycles is larger, the travel distance of a dump truck 20 tends to be longer, which means that the operation amount of the dump truck 20 is large. In this manner, the relation between the dump truck identification data and the operation amount of the dump truck 20 may be output. Alternatively, considering the difference in the distance from one course to another, the output device 16 may output the relation in which the number of cycles is replaced by the travel distance for each piece of dump truck identification data.

Furthermore, when the presence of two dump trucks 20 having the same damage amount is found in the graph of FIG. 13, and if one of the two dump trucks 20 has a large operation amount while the other has a small operation amount in the graph of FIG. 14, the former dump truck 20 can be assessed as having a small damage amount despite the large operation amount. The other dump truck 20 can be assessed as having a large damage amount despite the small operation amount. In this manner, assessment based on combination of the graph of FIG. 13 and the graph of FIG. 14 allows the relation of the operation amount, the damage amount DM1, and the dump truck identification data to be shown. If the travel distance is adopted in FIG. 14, the relation of the travel distance, the damage amount DM1 and the dump truck 20 can be shown.

FIGS. 15 to 18 illustrate example outputs of stationary steering operation.

Figure 15:
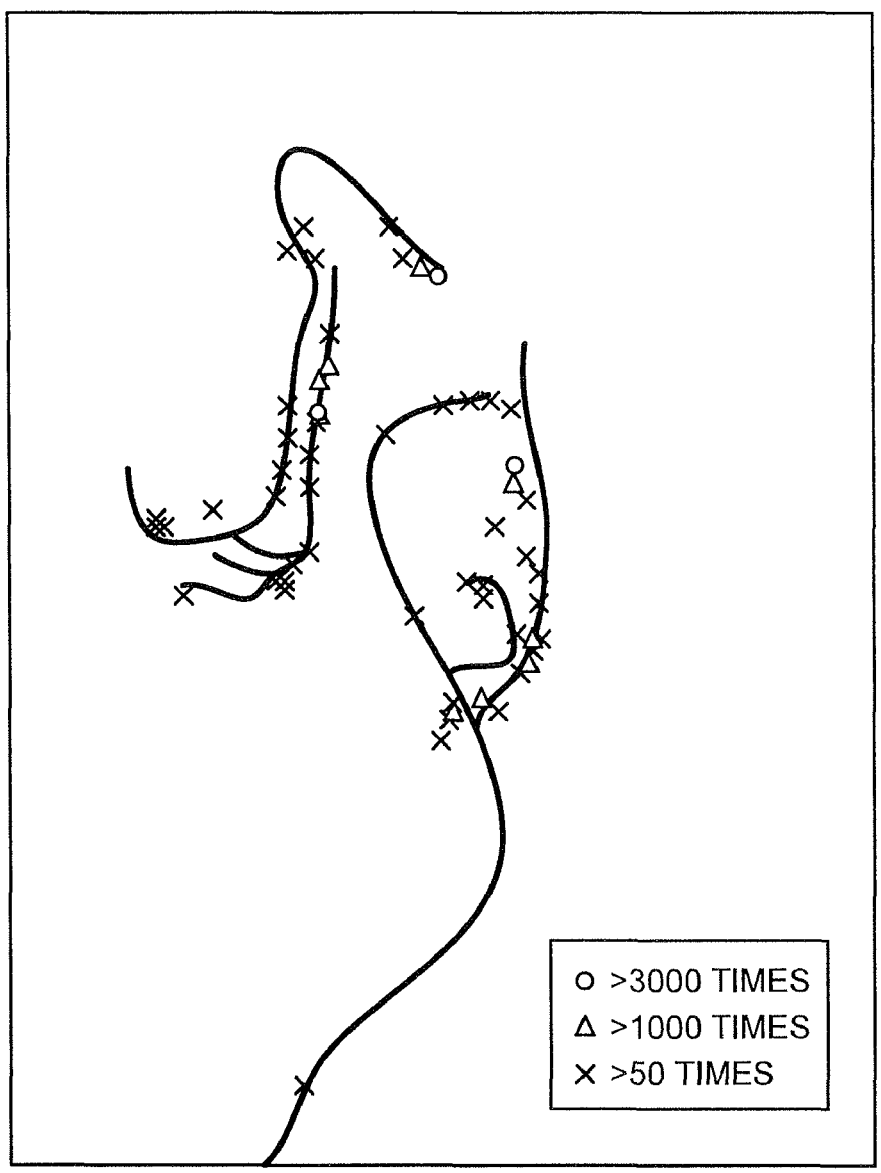
FIG. 15 is a diagram illustrating an example output of the output device according to the present embodiment.

FIG. 15 illustrates the positions at which the stationary steering operation has been carried out on the reference travel paths, and the number of times the stationary steering operation has been carried out at the positions. The number of times the operation has been carried out is the number of times a month the operation has been carried out, for example.

Figure 16:
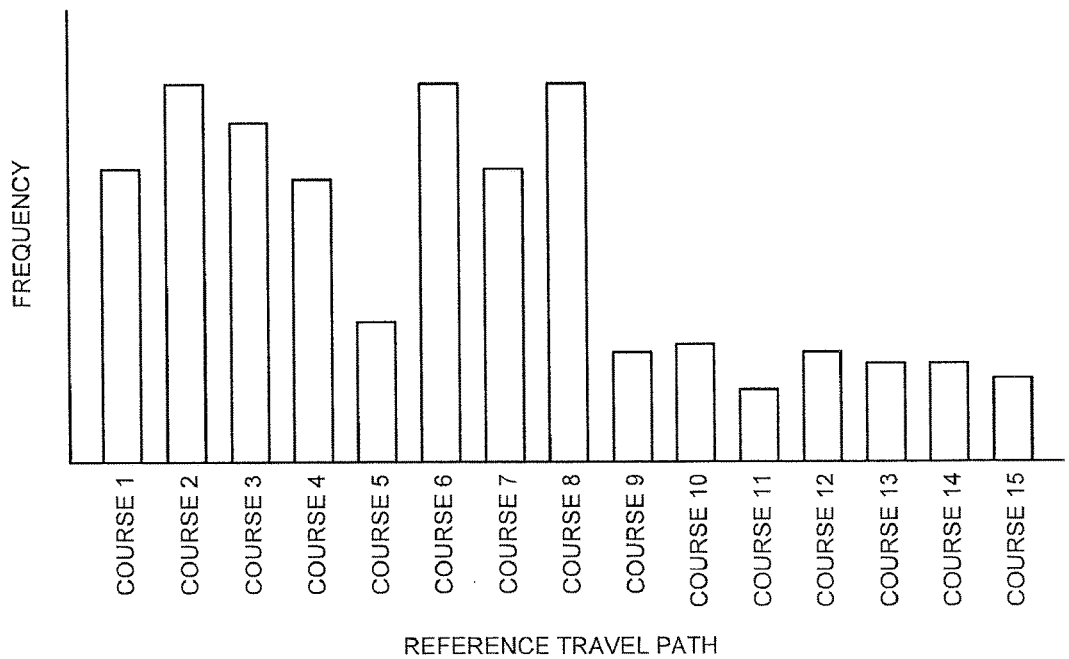
FIG. 16 is a graph illustrating an example output of the output device according to the present embodiment.

FIG. 16 illustrates the relation between multiple generated reference travel paths and the frequency of the stationary steering operation carried out on each reference travel path.

The example illustrated in FIG. 16 illustrates the relation between multiple reference travel paths (courses 1 to 15) and the frequency indicating the average value of the numbers of times the stationary steering operation has been carried out during one-cycle travel on each course. The horizontal axis represents the courses, and the vertical axis represents the frequency.

Figure 17:
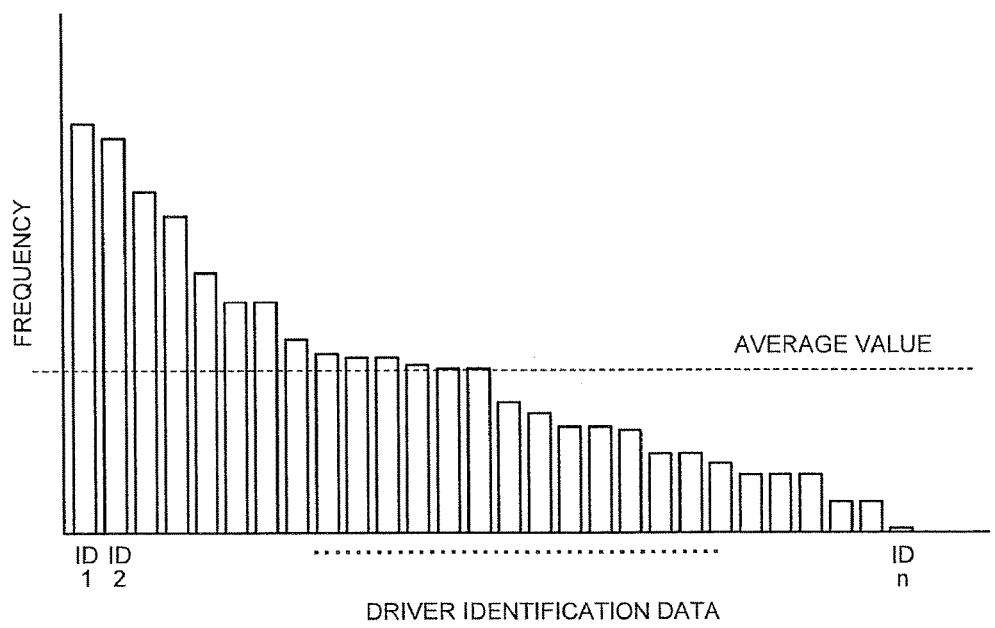
FIG. 17 is a graph illustrating an example output of the output device according to the present embodiment.

FIG. 17 illustrates the relation between the driver identification data of the dump trucks 20 and the frequency of the stationary steering operation carried out on the reference travel paths by each driver. The horizontal axis represents multiple drivers, and the vertical axis represents the frequency. As illustrated in FIG. 17, the output device 16 can output association data containing the stationary steering operation data (number-of-times data) of the damaging operation data associated with the driver identification data. Furthermore, as illustrated in FIG. 17, an average value of the frequencies may be calculated and output.

Figure 18:
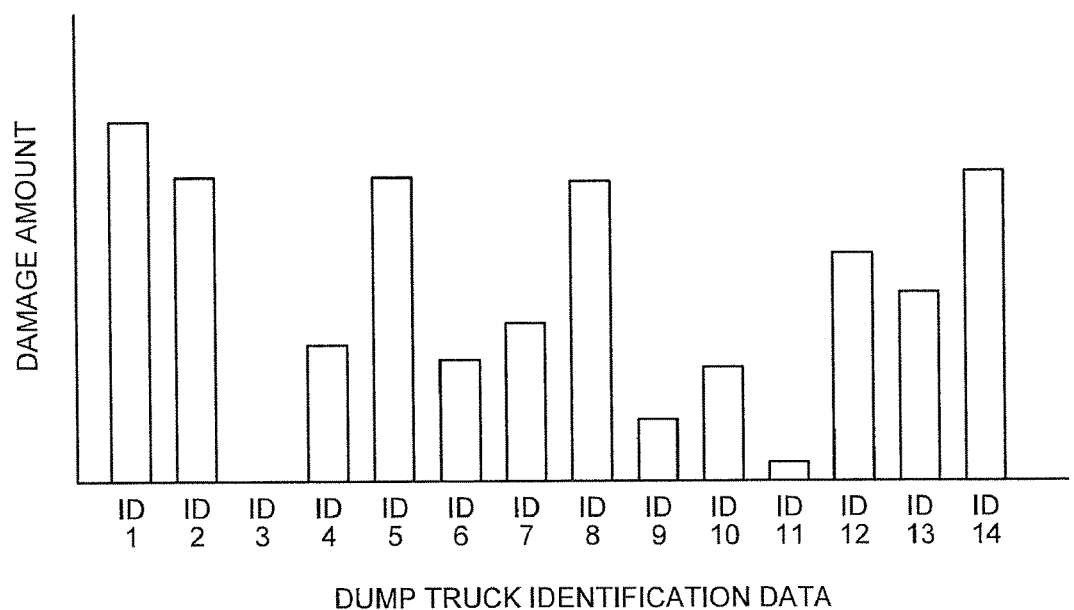
FIG. 18 is a graph illustrating an example output of the output device according to the present embodiment.

FIG. 18 illustrates the relation between the dump truck identification data and the amount of damage DM2 to tires 23T of the dump truck 20 caused by the stationary steering operation. The horizontal axis represents multiple dump trucks 20, and the vertical axis represents the accumulated value of damage amounts DM2 caused by multiple stationary steering operations. As illustrated in FIG. 18, the output device 16 can output association data containing the stationary steering operation data (damage amounts DM2) of the damaging operation data associated with the dump truck identification data.

Assessment based on combination of the graph of FIG. 18 and the graph of FIG. 14 allows the relation of the operation amount, the damage amount DM2, and the dump truck identification data to be shown. If the travel distance is adopted in FIG. 14, the relation of the travel distance, the damage amount DM2 and the dump truck 20 can be shown.

FIGS. 19 to 22 illustrate example outputs of aggressive cornering operation data.

Figure 19:
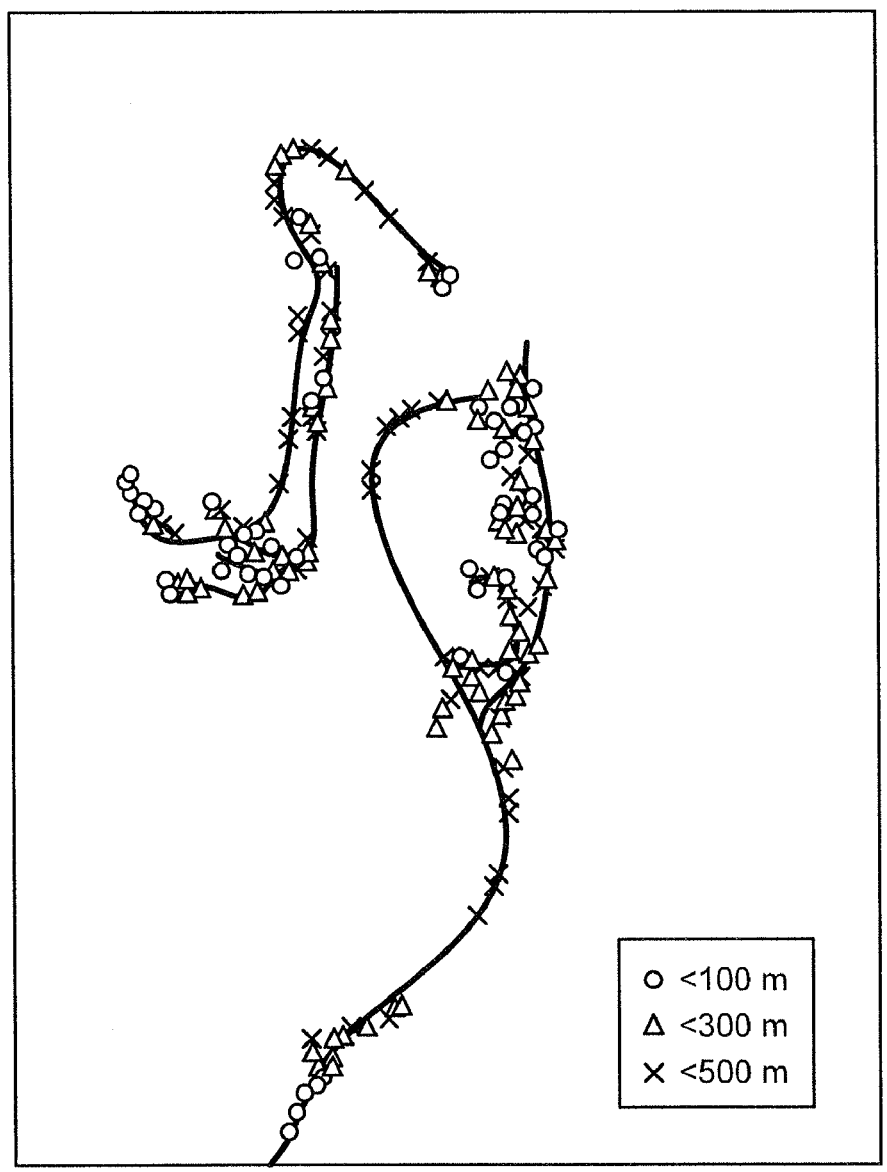
FIG. 19 is a diagram illustrating an example output of the output device according to the present embodiment.

FIG. 19 illustrates the positions (curves) at which the aggressive cornering operation has been carried out on the reference travel paths, and the radii of curvature of the curves.

Figure 20:
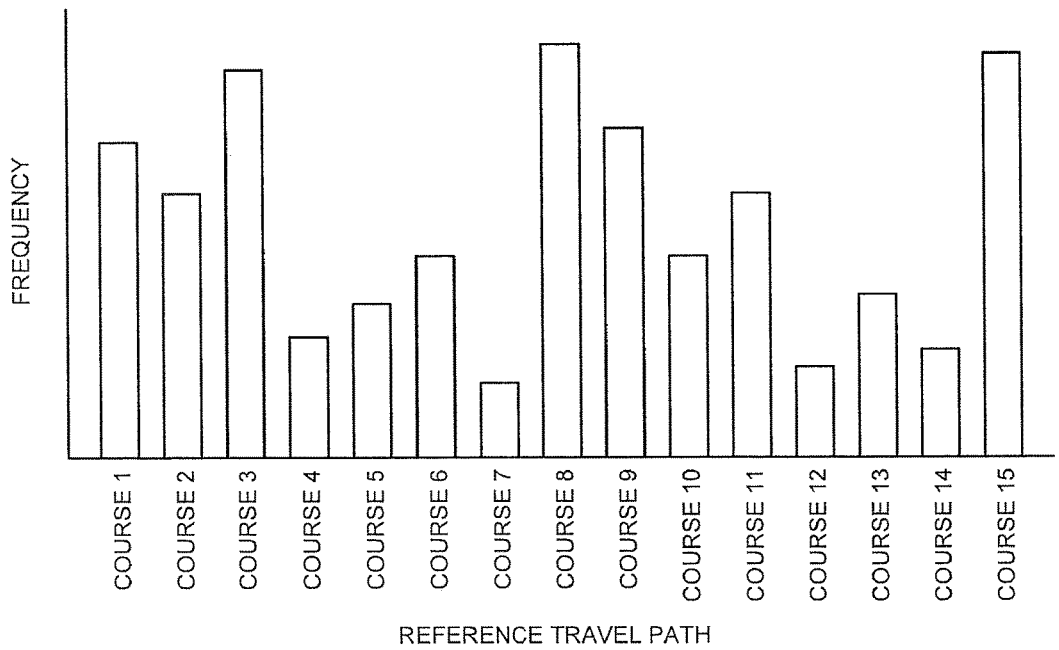
FIG. 20 is a graph illustrating an example output of the output device according to the present embodiment.

FIG. 20 illustrates the relation between multiple generated reference travel paths and the frequency of the aggressive cornering operation carried out on each reference travel path. The example illustrated in FIG. 20 illustrates the relation between multiple reference travel paths (courses 1 to 15) and the frequency indicating the average value of the numbers of times the aggressive cornering operation has been carried out during one-cycle travel on each course. The horizontal axis represents the courses, and the vertical axis represents the frequency.

Figure 21:
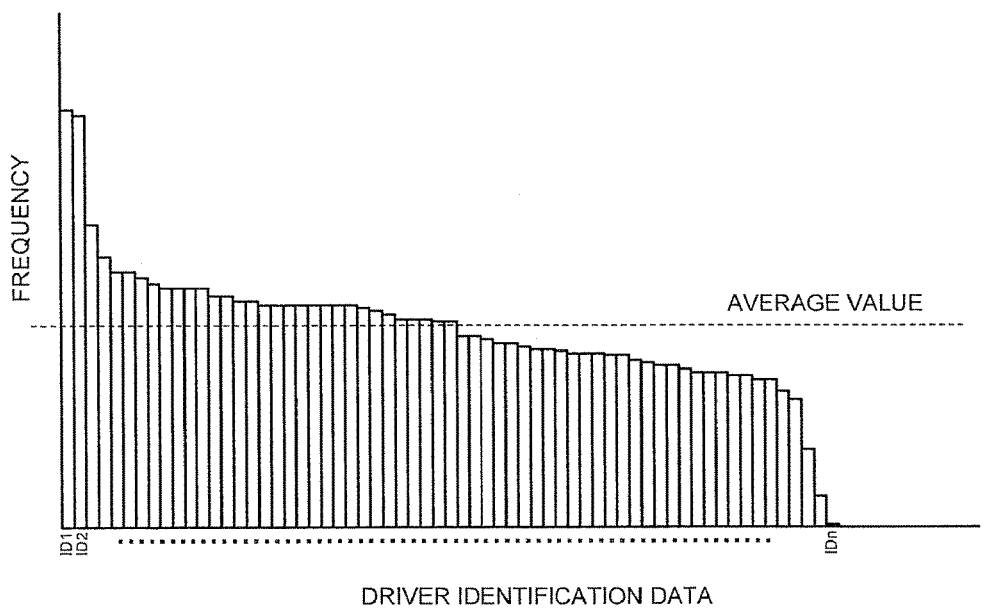
FIG. 21 is a graph illustrating an example output of the output device according to the present embodiment.

FIG. 21 illustrates the relation between the driver identification data of the dump trucks 20 and the frequency of the aggressive cornering operation carried out on the reference travel paths by each driver. The horizontal axis represents multiple drivers, and the vertical axis represents the frequency. As illustrated in FIG. 21, the output device 16 can output association data containing the aggressive cornering operation data (number-of-times data) of the damaging operation data associated with the driver identification data. Furthermore, as illustrated in FIG. 21, an average value of the frequencies may be calculated and output.

Figure 22:
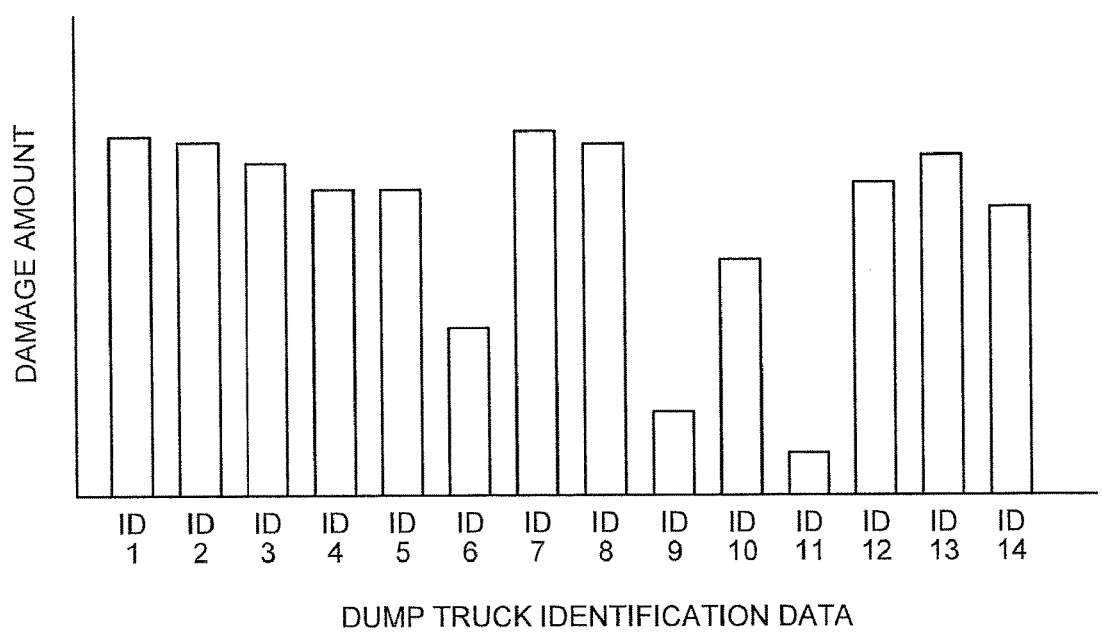
FIG. 22 is a graph illustrating an example output of the output device according to the present embodiment.

FIG. 22 illustrates the relation between the dump truck identification data and the amount of damage DM3 to tires 23T of the dump truck 20 caused by the aggressive cornering operation. The horizontal axis represents multiple dump trucks 20, and the vertical axis represents the accumulated value of damage amounts DM3 caused by multiple aggressive cornering operations. As illustrated in FIG. 22, the output device 16 can output association data containing the aggressive cornering operation data (damage amounts DM3) of the damaging operation data associated with the dump truck identification data.

Assessment based on combination of the graph of FIG. 22 and the graph of FIG. 14 allows the relation of the operation amount, the damage amount DM3, and the dump truck identification data to be shown. If the travel distance is adopted in FIG. 14, the relation of the travel distance, the damage amount DM3 and the dump truck 20 can be shown.

While FIG. 13 illustrates an example in which the relation between dump truck identification data and the damage amount DM1 is output, the relation between the driver identification data and the damage amount DM1 may alternatively be output. In this case, assessment may be conducted on the basis of combination with a graph of the number of cycles for each driver (corresponding to FIG. 14).

<Effects>

As described above, according to the present embodiment, since the driver identification data of the driver who has carried out the damaging operation and the damaging operation data are output in association with each other, driving guidance can be provided to a driver who has carried out damaging operations at a high frequency, for example. As a result, the damaging operations that are carried out are reduced, which reduces shortening of the lifetime of the tires 23T. Thus, the decrease in the productivity and the increase in the production cost of a mine are reduced.

Furthermore, since the position data of the dump truck 20 on which a damaging operation has been carried out and the damaging operation data are output in association with each other, a position on a reference travel path at which the damaging operation is carried out at a high frequency can be located, for example. As a result, measures for reducing carrying out of damaging operations such as improvement in a travel path can be taken, for example. As a result, shortening of the lifetime of the tires 23T is reduced, and the decrease in the productivity and the increase in the production cost of a mine are reduced.

Furthermore, according to the present embodiment, the position data can be appropriately acquired by the position detection device 29 of the dump truck 20.

In the present embodiment, the rapid deceleration operation, the stationary steering operation, and the aggressive cornering operation are assessed as the damaging operations. As a result, damages to the tires 23T can be appropriately assessed.

The damaging operation is highly correlated with the traveling speed of the dump truck 20. Thus, the determination unit 12d can appropriately determine whether or not a damaging operation has been carried out on the basis of a detection signal from the speed detection device 39.

Furthermore, in the present embodiment, the damage amount DM1 caused by the rapid deceleration operation is assessed on the basis of the expression (1). As a result, the relation between the damage amount DM1 and at least one of the driver identification data and the position data is appropriately obtained.

Furthermore, in the present embodiment, the damage amount DM2 caused by the stationary steering operation is assessed on the basis of the expression (2). As a result, the relation between the damage amount DM2 and at least one of the driver identification data and the position data is appropriately obtained.

Furthermore, in the present embodiment, the damage amount DM3 caused by the aggressive cornering operation is assessed on the basis of the expression (3). As a result, the relation between the damage amount DM3 and at least one of the driver identification data and the position data is appropriately obtained.

Furthermore, in the present embodiment, since the association data contains the damaging operation data associated with the dump truck identification data, it is possible to determine whether or not a damaging operation is caused by a change (degradation) in the performance of a dump truck 20, for example. Specifically, it is possible to appropriately determine whether a damaging operation is attributed to a driver, to the position of a reference travel path (including the position of a curve, the position of an upslope, and the position of a downslope), or to a dump truck 20.

Furthermore, since the time point data indicating the time point at which a damaging operation was carried out is acquired and the damaging operation data is output in association with the time point data, it is possible to determine whether or not a damaging operation is caused owing to the operation time slot of the dump trucks 20. If damaging operations are often carried out in night hours, for example, measures for reducing carrying out of damaging operations such as improvement in labor conditions can be taken.

Note that, in the embodiment described above, an example in which a reference travel path CSB is obtained from a GPS position by using the approximate curve has been described. The reference travel path CSB may be determined on the basis of course data set in advance. For example, the reference travel path CSB may be determined on the basis of construction data of a mine set in advance such as a design data (including CAD data) of the mine, for example. The construction data of a mine includes multiple designed position data.

Note that, in the present embodiment, the management device 10 set in a management facility of a mine carries out data processing on damages to tires 23T. Data necessary for data processing on damages to tires 23T including at least one of the damaging operation data, the driver identification data, and the position data may be transmitted to a computer system (server) away from the mine via the Internet. The computer system may carry out the data processing on damages to tires 23T. The mine and the computer system may be provided in the same country. The mine may be provided in a first country and the computer system may be provided in a second country (foreign country).

Note that, in the embodiment described above, the management system 1 including the management device 10 carries out data processing on damages to tires 23T. The data processing on damages to tires 23T carried out by the management system 1 described in the embodiment described above may be executed by a processing device including a computer system mounted on a dump truck 20. Specifically, a processing device mounted on a dump truck 20 may include a determining unit that determines whether or not a damaging operation damaging tires 23T has been carried out, a data acquisition unit that acquires damaging operation data indicating carrying out of the damaging operation, and one or both of driver identification data indicating the driver who has carried out the damaging operation and position data indicating the position of a dump truck 20 on which the damaging operation has been carried out, and a data output unit that outputs association data containing the damaging operation data associated with one or both of the driver identification data and the position data. The data output unit of the dump truck 20 may output (display) the association data onto a display device (monitor) placed in the cab. The data output unit of the dump truck 20 may transmit the association data to the management device 10 via the in-vehicle wireless communication device 27.

REFERENCE SIGNS LIST 1 management system
2 gas station
3 relay
4 loader
5 GPS satellite
6 intermediate relay
7 communication coverage
10 management device
12 management processing device
12a travel path computation unit
12b estimation unit
12c timer
12d determination unit
12e data acquisition unit
12f data output unit
13 management storage device
15 input/output unit
16 output device
16A display device
16S printing device
17 input device
18 management wireless communication device
18A antenna
19 control system
20 dump truck
21 vehicle body
22 vessel
23 wheel assembly
23M wheel
23T tire
24 suspension cylinder
25 rotation sensor
26 suspension pressure sensor
27 in-vehicle wireless communication device
28A antenna
28B GNSS antenna
29 position information detection device
30 in-vehicle information collection device
31 in-vehicle storage device
32A engine control device
32B travel control device
32C hydraulic control device
32D steering device
33A accelerator
33B shift lever
33C dump lever
33D steering force detection device
34F fuel injection system
34G engine
34TC torque converter
34TM transmission
34DS drive shaft
34P oil pump
35 hydraulic oil control valve
36 hoist cylinder
37 traveling device
38 driver ID acquisition device
39 speed detection device
40 dump truck ID acquisition device 41 load detection device
42 timer
50 condition acquisition device
CN 1 curve
CN 2 curve
CSB reference travel path
CSr actual travel path
CSr 1 outward path
CSr 2 homeward path
CT 1 position
CT 2 position
DPA soil discharging site
DPr discharging position
LPA loading site
LPr loading position
M mountain
PI position data
R 1 radius of curvature
R 2 radius of curvature
Rg travel path
Rr travel path
SPr travel start position

The invention claimed is:

1. A management system for a mining machine on which tires are mounted and which travels in a mine by operation performed by a driver, the management system comprising:
   a determination unit configured to determine whether or not a damaging operation damaging the tires has been carried out;
   a data acquisition unit configured to acquire damaging operation data indicating carrying out of the damaging operation, and driver identification data indicating the driver who has carried out the damaging operation;
   a data output unit configured to output association data containing the damaging operation data associated with the driver identification data; and
   a detector configured to detect a traveling characteristic of the mining machine, wherein
   the detector detects a traveling characteristic of the mining machine,
   the determination unit determines an occurrence of the damaging operation based on a detection signal from the detector, and
   the data output unit outputs the association data in a report showing at least one of a frequency, a damage amount, and a position of the damaging operation for the driver.

2. The management system for a mining machine according to claim 1, wherein
   the data acquisition unit is configured to acquire position data indicating a position of the mining machine on which the damaging operation has been carried out; and
   the data output unit is configured to output association data containing the damaging operation data associated with both of the driver identification data and the position data.

3. The management system for a mining machine according to claim 2, further comprising a position detection device configured to detect a position of the mining machine, wherein
   the data acquisition unit acquires the position data from the position detection device.

4. The management system for a mining machine according to any one of claims 1, 3 and 2, wherein, the damaging operation includes at least one of a rapid deceleration operation of decelerating the mining machine at a first speed or higher per unit time, a stationary steering operation of changing a direction of the tires of the mining machine at a second speed or lower, and an aggressive cornering operation of making the mining machine travel along a curve having a radius of curvature of a predetermined value or smaller at a third speed or higher.

5. The management system for a mining machine according to claim 4, wherein the detector is a speed detection device configured to detect a traveling speed and a deceleration of the mining machine, wherein
   the determination unit determines whether or not the damaging operation has been carried out on the basis of a detection signal from the speed detection device.

6. The management system for a mining machine according to claim 1, wherein
   the data acquisition unit acquires mining machine identification data indicating the mining machine on which the damaging operation has been carried out, and
   the association data contains the damaging operation data associated with the mining machine identification data.

7. The management system for a mining machine according to claim 1, wherein
   the data acquisition unit acquires time point data indicating a time point at which the damaging operation has been carried out, and
   the association data contains the damaging operation data associated with the time point data.

8. The management system for a mining machine according to claim 1, further comprising a travel path computation unit configured to generate a reference travel path in the mine on the basis of position data of an actual travel path along which multiple mining machines have traveled in the mine, wherein
   the data acquisition unit acquires the damaging operation data when the mining machine is present on the reference travel path.

9. The management system for a mining machine according to claim 1, wherein the data output unit includes a report creation unit configured to create a report of the association data.

10. A management system for a mining machine on which tires are mounted and which travels in a mine by operation performed by a driver, the management system comprising:
    a determination unit configured to determine whether or not a damaging operation damaging the tires has been carried out;
    a data acquisition unit configured to acquire damaging operation data indicating carrying out of the damaging operation, and driver identification data indicating the driver who has carried out the damaging operation;
    a data output unit configured to output association data containing the damaging operation data associated with the driver identification data;
    a speed detection device configured to detect a traveling speed and a deceleration of the mining machine; and
    a load detection device configured to detect a load acting on the tire, wherein
    the damaging operation includes a rapid deceleration operation of decelerating the mining machine at a first speed or higher per unit time, and
    the determination unit determines whether or not the damaging operation has been carried out on the basis of a detection signal from the speed detection device, and determines whether or not the rapid deceleration operation has been carried out on the basis of deceleration data indicating the deceleration of the mining machine and load data indicating the load acting on the tires, and the data output unit outputs the association data in a report showing at least one of a frequency, a damage amount, and a position of the damaging operation for the driver.

11. The management system for a mining machine according to claim 10, wherein
the mining machine includes a dump truck having a vehicle body and a vessel supported by the vehicle body, and
the load acting on the tires varies according to a load placed on the vessel.

12. A management system for a mining machine on which tires are mounted and which travels in a mine by operation performed by a driver, the management system comprising:
a determination unit configured to determine whether or not a damaging operation damaging the tires has been carried out;
a data acquisition unit configured to acquire damaging operation data indicating carrying out of the damaging operation, and driver identification data indicating the driver who has carried out the damaging operation;
a data output unit configured to output association data containing the damaging operation data associated with the driver identification data;
a speed detection device configured to detect a traveling speed and a deceleration of the mining machine; and
a steering force detection device configured to detect a steering force that changes a direction of the tires, wherein
the damaging operation includes a stationary steering operation of changing the direction of the tires at a second speed or lower, and
the determination unit determines whether or not the damaging operation has been carried out on the basis of a detection signal from the speed detection device, and determines whether or not the stationary steering operation has been carried out on the basis of traveling speed data indicating the traveling speed of the mining machine and steering force data indicating the steering force.

13. The management system for a mining machine according to claim 12, wherein
the mining machine includes a dump truck having a vehicle body and a vessel supported by the vehicle body, and
the load acting on the tires varies according to a load placed on the vessel.

14. A management system for a mining machine on which tires are mounted and which travels in a mine by operation performed by a driver, the management system comprising:
a determination unit configured to determine whether or not a damaging operation damaging the tires has been carried out;
a data acquisition unit configured to acquire damaging operation data indicating carrying out of the damaging operation, and driver identification data indicating the driver who has carried out the damaging operation;
a data output unit configured to output association data containing the damaging operation data associated with the driver identification data;
a speed detection device configured to detect a traveling speed and a deceleration of the mining machine; and
a load detection device configured to detect a load acting on the tires, wherein the damaging operation includes an aggressive cornering operation of making the mining machine travel along a curve having a radius of curvature of a predetermined value or smaller at a third speed or higher, and
the determination unit determines whether or not the damaging operation has been carried out on the basis of a detection signal from the speed detection device, and determines whether or not the aggressive cornering operation has been carried out on the basis of traveling speed data indicating the traveling speed of the mining machine, load data indicating the load acting on the tires, and the radius of curvature of the curve.

15. The management system for a mining machine according to claim 14, wherein
the mining machine includes a dump truck having a vehicle body and a vessel supported by the vehicle body, and
the load acting on the tires varies according to a load placed on the vessel.

16. A management method for a mining machine on which tires are mounted and which travels in a mine by operation performed by a driver, the management method comprising:
detecting via a detector a traveling characteristic of the mining machine;
determining whether or not a damaging operation damaging the tires has been carried out based on a detection signal from the detector;
acquiring damaging operation data indicating carrying out of the damaging operation, and driver identification data indicating a driver who has carried out the damaging operation; and
outputting association data containing the damaging operation data associated with the driver identification data, the association data being outputted in a report showing at least one of a frequency, a damage amount, and a position of the damaging operation for the driver.

17. A dump truck on which tires are mounted and which travels in a mine by operation performed by a driver, the dump truck comprising:
a determination unit configured to determine whether or not a damaging operation damaging the tires has been carried out;
a data acquisition unit configured to acquire damaging operation data indicating carrying out of the damaging operation, and driver identification data indicating a driver who has carried out the damaging operation;
a data output unit configured to output association data containing the damaging operation data associated with the driver identification data; and
a detector configured to detect a traveling characteristic of the mining machine, wherein
the detector detects a traveling characteristic of the mining machine,
the determination unit determines an occurrence of the damaging operation based on a detection signal from the detector, and
the data output unit outputs the association data in a report showing at least one of a frequency, a damage amount, and a position of the damaging operation for the driver.

* * * * *